US012265526B2

(12) United States Patent
Saxe et al.

(10) Patent No.: US 12,265,526 B2
(45) Date of Patent: **\*Apr. 1, 2025**

(54) METHODS AND APPARATUS FOR NATURAL LANGUAGE INTERFACE FOR CONSTRUCTING COMPLEX DATABASE QUERIES

(71) Applicant: Sophos Limited, Abingdon (GB)

(72) Inventors: Joshua Daniel Saxe, Wichita, KS (US); Younghoo Lee, Asquith (AU)

(73) Assignee: Sophos Limited, Abingdon (GB)

( * ) Notice: Subject to any disclaimer, the term of this patent is extended or adjusted under 35 U.S.C. 154(b) by 335 days.

This patent is subject to a terminal disclaimer.

(21) Appl. No.: 17/710,036

(22) Filed: Mar. 31, 2022

(65) Prior Publication Data

US 2023/0315722 A1    Oct. 5, 2023

(51) Int. Cl.
*G06F 16/242* (2019.01)
*G06N 20/00* (2019.01)
*H04L 9/40* (2022.01)

(52) U.S. Cl.
CPC ........ *G06F 16/2428* (2019.01); *G06F 16/243* (2019.01); *G06N 20/00* (2019.01); *H04L 63/20* (2013.01)

(58) Field of Classification Search
CPC ............... G06F 16/2428; G06F 16/243; G06F 16/90324; G06F 16/3322; G06N 20/00; H04L 63/20
See application file for complete search history.

(56) References Cited

U.S. PATENT DOCUMENTS 5,276,789 A    1/1994  Besaw et al.
5,471,399 A    11/1995 Tanaka et al.
(Continued)

FOREIGN PATENT DOCUMENTS

CN    103914657 A    7/2014
CN    104504337 A    4/2015
(Continued)

OTHER PUBLICATIONS

International Search Report and Written Opinion for International Application No. PCT/GB2023/051290, mailed on Oct. 2, 2023, 16 pages.
(Continued)

*Primary Examiner* — Jonathan A Bui
*Assistant Examiner* — Tania M Pena-Santana
(74) *Attorney, Agent, or Firm* — COOLEY LLP

(57) ABSTRACT

In some embodiments, a processor receives, via an interface, natural language data associated with a user request for performing an identified computational task associated with a cybersecurity management system. The processor is configured to provide the natural language data as input to a machine learning (ML) model. The ML model is configured to automatically infer a template query based on the natural language data. The processor is further configured to cause the template query to be displayed, via the interface. The processor is further configured to receive, via the interface, user input indicating a finalized query associated with the identified computational task, and to provide the finalized query as input to a system configured to perform the identified computational task. The processor is further configured to modify a security setting in the cybersecurity management system based on the performance of the identified computational task.

20 Claims, 17 Drawing Sheets

(56) References Cited

U.S. PATENT DOCUMENTS

| | | |
|---|---|---|
| 5,793,974 A | 8/1998 | Messinger |
| 5,958,012 A | 9/1999 | Battat et al. |
| 6,225,999 B1 | 5/2001 | Jain et al. |
| 6,347,336 B1 | 2/2002 | Song et al. |
| 6,714,976 B1 | 3/2004 | Wilson et al. |
| 6,885,387 B1 | 4/2005 | Machida |
| 6,885,641 B1 | 4/2005 | Chan et al. |
| 7,155,514 B1 | 12/2006 | Milford |
| 7,194,769 B2 | 3/2007 | Lippmann et al. |
| 7,594,270 B2 | 9/2009 | Church et al. |
| 7,624,448 B2 | 11/2009 | Coffman |
| 7,934,257 B1 | 4/2011 | Kienzle et al. |
| 7,945,787 B2 | 5/2011 | Gassoway |
| 8,181,244 B2 | 5/2012 | Boney |
| 8,201,243 B2 | 6/2012 | Boney |
| 8,225,394 B2 | 7/2012 | Gassoway |
| 8,401,982 B1 | 3/2013 | Satish et al. |
| 8,418,250 B2 | 4/2013 | Morris et al. |
| 8,499,204 B2 | 7/2013 | Lovy et al. |
| 8,578,490 B2 | 11/2013 | Moran |
| 8,607,347 B2 | 12/2013 | Harris et al. |
| 8,719,932 B2 | 5/2014 | Boney |
| 8,726,389 B2 | 5/2014 | Morris et al. |
| 8,763,123 B2 | 6/2014 | Morris et al. |
| 8,779,921 B1 | 7/2014 | Curtiss |
| 8,805,995 B1 | 8/2014 | Oliver |
| 8,813,236 B1 | 8/2014 | Saha et al. |
| 8,856,505 B2 | 10/2014 | Schneider |
| 8,881,288 B1 | 11/2014 | Levy et al. |
| 9,141,790 B2 | 9/2015 | Roundy et al. |
| 9,185,124 B2 | 11/2015 | Chakraborty |
| 9,189,634 B2 | 11/2015 | Lin |
| 9,235,716 B1 | 1/2016 | Brucker et al. |
| 9,390,263 B2 | 7/2016 | Thomas |
| 9,392,015 B2 | 7/2016 | Thomas |
| 9,411,953 B1 | 8/2016 | Kane et al. |
| 9,413,721 B2 | 8/2016 | Morris et al. |
| 9,419,989 B2 | 8/2016 | Harris et al. |
| 9,516,052 B1 | 12/2016 | Chauhan et al. |
| 9,571,512 B2 | 2/2017 | Ray et al. |
| 9,578,045 B2 | 2/2017 | Jaroch et al. |
| 9,602,530 B2 | 3/2017 | Ellis et al. |
| 9,690,938 B1 | 6/2017 | Saxe et al. |
| 9,727,726 B1 | 8/2017 | Allen |
| 9,736,182 B1 | 8/2017 | Madhukar et al. |
| 9,774,613 B2 | 9/2017 | Thomas et al. |
| 9,842,219 B1 | 12/2017 | Gates et al. |
| 9,898,604 B2 | 2/2018 | Fang et al. |
| 9,917,851 B2 | 3/2018 | Ray |
| 9,917,859 B2 | 3/2018 | Harris et al. |
| 9,934,378 B1 | 4/2018 | Hotta et al. |
| 9,940,459 B1 | 4/2018 | Saxe |
| 9,965,627 B2 | 5/2018 | Ray et al. |
| 9,967,282 B2 | 5/2018 | Thomas et al. |
| 9,967,283 B2 | 5/2018 | Ray et al. |
| 10,061,922 B2 | 8/2018 | Altman et al. |
| 10,075,462 B2 | 9/2018 | Mehta et al. |
| 10,078,571 B2 | 9/2018 | Altman et al. |
| 10,120,998 B2 | 11/2018 | Ghosh et al. |
| 10,122,687 B2 | 11/2018 | Thomas et al. |
| 10,122,753 B2 | 11/2018 | Thomas |
| 10,181,034 B2 | 1/2019 | Harrison et al. |
| 10,205,735 B2 | 2/2019 | Apostolopoulos |
| 10,257,224 B2 | 4/2019 | Jaroch et al. |
| 10,284,587 B1 | 5/2019 | Schlatter et al. |
| 10,284,591 B2 | 5/2019 | Giuliani et al. |
| 10,333,962 B1 | 6/2019 | Brandwine et al. |
| 10,397,261 B2 | 8/2019 | Ikuse et al. |
| 10,440,036 B2 | 10/2019 | Pal et al. |
| 10,489,587 B1 | 11/2019 | Kennedy et al. |
| 10,581,886 B1 | 3/2020 | Sharifi Mehr |
| 10,599,844 B2 | 3/2020 | Schmidtler et al. |
| 10,791,131 B2 | 9/2020 | Nor et al. |
| 10,887,331 B2 | 1/2021 | Nomura et al. |
| 10,938,838 B2 | 3/2021 | Saxe et al. |
| 10,972,485 B2 | 4/2021 | Ladnai et al. |
| 11,016,964 B1* | 5/2021 | Hinegardner ....... G06F 16/2428 |
| 11,183,175 B2 | 11/2021 | Larson et al. |
| 11,269,872 B1 | 3/2022 | Moo et al. |
| 11,620,379 B1 | 4/2023 | Hegde et al. |
| 11,755,974 B2 | 9/2023 | Saxe et al. |
| 2002/0113816 A1 | 8/2002 | Mitchell et al. |
| 2003/0046390 A1 | 3/2003 | Ball et al. |
| 2003/0146929 A1 | 8/2003 | Baldwin et al. |
| 2003/0159069 A1 | 8/2003 | Choi et al. |
| 2003/0172294 A1 | 9/2003 | Judge |
| 2004/0064545 A1 | 4/2004 | Miyake |
| 2005/0055641 A1 | 3/2005 | Machida |
| 2005/0071482 A1 | 3/2005 | Gopisetty et al. |
| 2005/0262569 A1* | 11/2005 | Shay ................ G06F 21/577 726/26 |
| 2007/0150957 A1 | 6/2007 | Hartrell et al. |
| 2008/0134142 A1 | 6/2008 | Nathan et al. |
| 2009/0044024 A1 | 2/2009 | Oberheide et al. |
| 2009/0077664 A1 | 3/2009 | Hsu et al. |
| 2009/0300166 A1 | 12/2009 | Chen et al. |
| 2009/0328210 A1 | 12/2009 | Khachaturov et al. |
| 2010/0287229 A1 | 11/2010 | Hauser |
| 2011/0016208 A1 | 1/2011 | Jeong et al. |
| 2011/0023120 A1 | 1/2011 | Dai et al. |
| 2011/0196964 A1 | 8/2011 | Natarajan et al. |
| 2011/0246753 A1 | 10/2011 | Thomas |
| 2012/0198806 A1 | 8/2012 | Shay et al. |
| 2013/0036472 A1 | 2/2013 | Aziz |
| 2013/0117848 A1 | 5/2013 | Golshan et al. |
| 2013/0179460 A1 | 7/2013 | Acuña et al. |
| 2014/0040245 A1 | 2/2014 | Rubinstein et al. |
| 2014/0075557 A1 | 3/2014 | Balabine et al. |
| 2014/0143825 A1 | 5/2014 | Behrendt et al. |
| 2014/0181805 A1 | 6/2014 | Zaitsev |
| 2014/0223563 A1 | 8/2014 | Durie et al. |
| 2014/0325650 A1 | 10/2014 | Pavlyushchik |
| 2014/0359768 A1 | 12/2014 | Miliefsky |
| 2015/0096025 A1 | 4/2015 | Ismael |
| 2015/0293954 A1 | 10/2015 | Hsiao et al. |
| 2015/0294244 A1 | 10/2015 | Bade et al. |
| 2015/0310213 A1 | 10/2015 | Ronen et al. |
| 2015/0312267 A1 | 10/2015 | Thomas |
| 2015/0319261 A1 | 11/2015 | Lonas et al. |
| 2016/0055337 A1 | 2/2016 | El-Moussa |
| 2016/0078225 A1 | 3/2016 | Ray et al. |
| 2016/0127401 A1 | 5/2016 | Chauhan et al. |
| 2016/0173510 A1 | 6/2016 | Harris et al. |
| 2016/0191554 A1 | 6/2016 | Kaminsky |
| 2016/0215933 A1 | 7/2016 | Skelton et al. |
| 2016/0218933 A1 | 7/2016 | Porras et al. |
| 2016/0283715 A1 | 9/2016 | Duke et al. |
| 2016/0292016 A1 | 10/2016 | Bussard et al. |
| 2016/0292579 A1 | 10/2016 | Parikh et al. |
| 2017/0031565 A1 | 2/2017 | Chauhan et al. |
| 2017/0063896 A1 | 3/2017 | Muddu et al. |
| 2017/0063899 A1 | 3/2017 | Muddu et al. |
| 2017/0063903 A1 | 3/2017 | Muddu et al. |
| 2017/0083703 A1 | 3/2017 | Abbasi et al. |
| 2017/0118228 A1 | 4/2017 | Cp et al. |
| 2017/0134397 A1 | 5/2017 | Dennison et al. |
| 2017/0244762 A1 | 8/2017 | Kinder et al. |
| 2017/0339178 A1 | 11/2017 | Mahaffey et al. |
| 2017/0346835 A1 | 11/2017 | Thomas et al. |
| 2017/0359373 A1 | 12/2017 | Jaladi et al. |
| 2018/0091535 A1 | 3/2018 | Chrosziel et al. |
| 2018/0096146 A1 | 4/2018 | Hao et al. |
| 2018/0203998 A1 | 7/2018 | Maisel et al. |
| 2018/0219888 A1 | 8/2018 | Apostolopoulos |
| 2018/0253458 A1 | 9/2018 | Goyal et al. |
| 2018/0357266 A1 | 12/2018 | Zenger et al. |
| 2019/0007435 A1 | 1/2019 | Pritzkau et al. |
| 2019/0034410 A1 | 1/2019 | Hudson et al. |
| 2019/0034540 A1* | 1/2019 | Perkins ............ G06F 16/9535 |
| 2019/0034624 A1 | 1/2019 | Chen et al. |
| 2019/0050567 A1 | 2/2019 | Chistyakov et al. |
| 2019/0068627 A1 | 2/2019 | Thampy |
| 2019/0114539 A1 | 4/2019 | Chistyakov et al. |
| 2019/0121973 A1 | 4/2019 | Li et al. |

(56) References Cited

U.S. PATENT DOCUMENTS

| | | | |
|---|---|---|---|
| 2019/0205322 A1 | 7/2019 | Dobrynin et al. | |
| 2019/0220595 A1 | 7/2019 | Gehweiler et al. | |
| 2019/0260779 A1 | 8/2019 | Bazalgette et al. | |
| 2019/0260804 A1 | 8/2019 | Beck et al. | |
| 2019/0311297 A1 | 10/2019 | Gapper | |
| 2019/0318089 A1 | 10/2019 | Wang | |
| 2019/0342330 A1 | 11/2019 | Wu et al. | |
| 2019/0384897 A1 | 12/2019 | Urmanov et al. | |
| 2020/0074078 A1 | 3/2020 | Saxe et al. | |
| 2020/0074336 A1 | 3/2020 | Saxe et al. | |
| 2020/0074360 A1 | 3/2020 | Humphries et al. | |
| 2020/0076833 A1 | 3/2020 | Ladnai et al. | |
| 2020/0076834 A1 | 3/2020 | Ladnai et al. | |
| 2020/0233960 A1 | 7/2020 | Copty et al. | |
| 2020/0301916 A1* | 9/2020 | Nguyen | G06F 16/3344 |
| 2020/0304528 A1 | 9/2020 | Ackerman et al. | |
| 2021/0049158 A1 | 2/2021 | Jiao et al. | |
| 2021/0211440 A1 | 7/2021 | Saxe et al. | |
| 2021/0211441 A1 | 7/2021 | Humphries et al. | |
| 2021/0250366 A1 | 8/2021 | Ladnai et al. | |
| 2021/0406253 A1 | 12/2021 | Agarwal | |
| 2022/0217166 A1 | 7/2022 | Ladnai et al. | |
| 2022/0217167 A1 | 7/2022 | Saxe et al. | |
| 2022/0292085 A1* | 9/2022 | Shahriar | G06F 16/24564 |
| 2022/0382527 A1 | 12/2022 | Wang et al. | |
| 2022/0414228 A1* | 12/2022 | Difonzo | G06F 16/24522 |
| 2023/0106226 A1 | 4/2023 | Bahrami et al. | |
| 2023/0146197 A1* | 5/2023 | Raman | G06F 40/174 704/9 |
| 2023/0185915 A1 | 6/2023 | Rao et al. | |
| 2023/0315856 A1 | 10/2023 | Lee et al. | |
| 2023/0316005 A1 | 10/2023 | Saxe | |
| 2023/0403286 A1 | 12/2023 | Saxe | |
| 2024/0037477 A1 | 2/2024 | Ladnai et al. | |
| 2024/0062133 A1 | 2/2024 | Saxe et al. | |
| 2024/0112115 A1 | 4/2024 | Ladnai et al. | |

FOREIGN PATENT DOCUMENTS

| | | |
|---|---|---|
| CN | 112395602 A | 2/2021 |
| EP | 3340570 A1 | 6/2018 |
| GB | 2587966 A | 4/2021 |
| JP | H0997150 A | 4/1997 |
| JP | 2009176132 A | 8/2009 |
| JP | 2017004233 A | 1/2017 |
| KR | 20090102001 A | 9/2009 |
| RU | 2659737 C1 | 7/2018 |
| WO | WO-2014152469 A1 | 9/2014 |
| WO | WO-2018086544 A1 | 5/2018 |
| WO | WO-2023187319 A1 | 10/2023 |

OTHER PUBLICATIONS

Office Action for Great Britain Application No. GB2303441 dated Aug. 31, 2023, 4 pages.

Padala, V., et al., "A noise filtering algorithm for event-based asynchronous change detection image sensors on truenorth and its implementation on truenorth", Frontiers in Neuroscience (2018); 12(118): 1-14.

Van De Erve, J., "Managing IIS Log File Storage" github (May 30, 2014) [online] https://github.com/MicrosoftDocs/iis-docs/blob/main/iis/manage/provisioning-and-managing-iis/managing-iis-log-file-storage.md (Access Date: Nov. 1, 2023); 5 pages.

International Search Report and Written Opinion for International Application No. PCT/GB2023/050650, dated May 22, 2023, 15 pages.

[Author Unknown] "GPT-3". Wikipedia, Feb. 16, 2022, [Online] Retrieved from the Internet, https://web.archive.org/web/20220224001844/https:/en.wikipedia.org/wiki/GPT-3, 9 pages.

[Author Unknown] "Sigma". SigmaHQ, Feb. 22, 2022, [Online] Retrieved from the Internet, https://archive.org/details/github.com-SigmaHQ-sigma_-_2022-02-22_18-10-22, 11 pages.

Lawton, George, "Exploring GPT-3 architecture", TechTarget, Jul. 15, 2021, [Online] Retrieved from the Internet, https://www.techtarget.com/searchenterpriseai/feature/Exploring-GPT-3-architecture, 5 pages.

Agarwal, M., et al., "Neurips 2020 nlc2cmd competition: Translating natural language to bash commands", NeurIPS 2020 Competition and Demonstration Track, Proceedings of Machine Learning Research (2021); 133: 302-324.

Combined Search and Examination Report for Great Britain Patent Application No. GB2303438.2 dated Feb. 9, 2024, 2 pages.

"Counterclaim-Defendants' Preliminary Invalidity Contentions Against Counterclaim Plaintiff Sophos Ltd", United States District Court Western District of Texas Waco Division Nov. 23, 2022, 59 Pages.

Duan, Y., et al., "Detective: Automatically Identify and Analyze Malware Processes in Forensic Scenarios via DLLs", IEEE ICC 2015—Next Generation Networking Symposium (2015); pp. 5691-5969.

Eberle, W., et al., "Insider Threat Detection Using a Graph-Based Approach", Journal of Applied Security Research (2010); 6: 32-81 [online] https://eecs.wsu.edu/~holder/pubs/EberleJASR11.pdf; 90 Pages.

Examination Report for Great Britain Patent Application No. GB2303438.2 dated Sep. 15, 2023, 5 pages.

Examination Report for Great Britain Patent Application No. GB2303438.2 mailed Aug. 9, 2024, 4 pages.

Examination Report for Great Britain Patent Application No. GB2303441.6 dated Aug. 7, 2024, 6 pages.

Examination Report for Great Britain Patent Application No. GB2303441.6 dated Feb. 2, 2024, 4 pages.

"Exhibit B-01 Invalidity of U.S. Pat. No. 9,967,267 Under AIA Section 102 or 103 in view of U.S. Pat. No. 10,440,036 ("PAL")", United States District Court Western District of Texas Waco Division Nov. 23, 2022, 163 Pages.

"Exhibit B-02 Invalidity of U.S. Pat. No. 9,967,267 Under AIA Section 102 or 103 in view of U.S. Patent No. 9,736,182 B1 ("Madhukar")", United States District Court Western District of Texas Waco Division Nov. 23, 2022, 146 Pages.

"Exhibit B-03 Invalidity of U.S. Pat. No. 9,967,267 Under AIA Section 102 or 103 in view of U.S. Patent Application Publication US 2015/0264062 ("Hagiwara")", United States District Court Western District of Texas Waco Division Nov. 23, 2022, 171 Pages.

"Exhibit B-04 Invalidity of U.S. Pat. No. 9,967,267 Under AIA Section 102 or 103 in view of U.S. Pat. No. 9,225,730 ("Brezinski")", United States District Court Western District of Texas Waco Division Nov. 23, 2022, 185 Pages.

"Exhibit B-05 Invalidity of U.S. Pat. No. 9,967,267 Under AIA Section 102 or 103 in view of U.S. Pat. No. 9,225,730 ("Li")", United States District Court Western District of Texas Waco Division Nov. 23, 2022, 161 Pages.

"Exhibit B-06 Invalidity of U.S. Pat. No. 9,967,267 Under AIA Section 102 or 103 in view of U.S. Pat. No. 10,397,261 ("Nomura")", United States District Court Western District of Texas Waco Division Nov. 23, 2022, 169 Pages.

"Exhibit B-07 Invalidity of U.S. Pat. No. 9,967,267 Under AIA Section 102 or 103 in view of U.S. Pat. No. 8,881,288 ("NOR")", United States District Court Western District of Texas Waco Division Nov. 23, 2022, 178 Pages.

"Exhibit B-08 Invalidity of U.S. Pat. No. 9,967,267 Under AIA Section 102 or 103 in view of Chinese Patent Application Publication No. CN 104504337 ("TAO")", United States District Court Western District of Texas Waco Division Nov. 23, 2022, 130 Pages.

"Exhibit B-09 Invalidity of U.S. Pat. No. 9,967,267 Under AIA Section 102 or 103 in view of U.S. Pat. No. 9,578,045 ("JAROCH")", United States District Court Western District of Texaswaco Division Nov. 23, 2022, 137 Pages.

"Exhibit B-10 Invalidity of U.S. Pat. No. 9,967,267 Under AIA Section 102 or 103 in view of U.S. Patent App. Publication No. 2011/0023120 ("DAI")", United States District Court Western District of Texaswaco Division Nov. 23, 2022, 144 pages.

"Exhibit B-103 Invalidity of U.S. Pat. No. 9,967,267 Obviousness Chart Under AIA 35 U.S.C. 103", United States District Court Western District of Texaswaco Division Nov. 23, 2022, 115 Pages.

(56) References Cited

OTHER PUBLICATIONS

"Exhibit B-11 Invalidity of U.S. Pat. No. 9,967,267 Under AIA Section 102 or 103 in view of Prior Art Products", United States District Court Western District of Texas Waco Division Nov. 23, 2022, 88 Pages.

Faruki, P., "Mining control flow graph as API call-grams to detect portable executable malware", Proceedings of the Fifth International Conference on Security of Information and Networks (Oct. 2012); pp. 130-137 [online] https://dl.acm.org/doi/10.1145/2388576.2388594; 8 Pages.

Fu, Q., et al., "A transformer-based approach for translating natural language to bash commands", 2021 20th IEEE International Conference on Machine Learning and Applications (ICMLA), IEEE (2021); 1245-1248.

Gardiner, J., "Command & Control: Understanding, Denying and Detecting", University of Birmingham (Feb. 2014); 38 pages.

Hu, X., et al., "Deep code comment generation", 2018 ACM/IEEE 26th International Conference on Program Comprehension (ICPC '18), Gothenburg, Sweden (May 27-28, 2018); 200-210.

Jha, S., et al., "Two Formal Analyses of Attack Graphs", Proceedings 15th IEEE Computer Security Foundations Workshop. CSFW-15., IEEE (2002) [online] https://citeseerx.ist.psu.edu/document?repid=rep1&type=pdf&doi=9dc8a70b13dfeb7318de291c858c2d65f1ddbd5f; 15 pages.

King, S., et al., "Backtracking Intrusions", Department of Electrical Engineering and Computer Science, University of Michigan, Proceedings of the nineteenth ACM symposium on Operating systems principles (Oct. 2003); 14 pages.

Lin, X. V., et al., "Program Synthesis from Natural Language Using Recurrent Neural Networks", University of Washington Department of Computer Science and Engineering, Seattle, WA, USA, Tech. Rep. UW-CSE-17-03 1 (2017); 1-12.

Manadhata, P., "Detecting Malicious Domains via Graph Inference", Proceedings of the 2014 Workshop on Artificial Intelligent and Security Workshop, ESORICS 2014, Part 1, LNCS 8712 (2014); 18 pages.

Marak, V., "Machine Learning Part 3: Ranking", Infosec (Apr. 4, 2013) [online] https://resources.infosecinstitute.com/topics/machine-learning-and-ai/machine-learningpart-3-ranking (Access Date: Sep. 23, 2023); 6 pages.

Non-Final Office Action for U.S. Appl. No. 17/709,574 dated Apr. 25, 2024, 21 pages.

Non-Final Office Action for U.S. Appl. No. 17/710,127 dated Apr. 2, 2024, 8 pages.

Notice of Allowance for U.S. Appl. No. 17/710,127 mailed Jun. 27, 2024, 9 pages.

Ranade, P., et al., "CyBERT: Contextualized Embeddings for the Cybersecurity Domain", 2021 IEEE International Conference on Big Data (Big Data) (2021); 3334-3342.

Raval, A., "Generation of Linux Commands Using Natural Language Descriptions", A Thesis Presented to The Academic Faculty, In Partial Fulfillment of the Requirements for the Degree Masters of Science in Computer Science, Georgia Institute of Technology (May 2018); 93 pages.

Rice, A., et al., "Command-and-control servers: The puppet masters that govern malware", TechTarget (Jun. 2014) [online] https://www.techtarget.com/searchsecurity/feature/Command-and-control-servers-The-puppet-masters-that-govern-malware (Access Date: Feb. 22, 2023); 7 Pages.

Shin, J., et al., "A survey of automatic code generation from natural language", Journal of Information Processing Systems (2021); 17(3): 537-555.

Song, X., et al., "A survey of automatic generation of source code comments: Algorithms and techniques", IEEE Access (2019); 7: 111411-111428.

Van De Erve, J., "Managing IIS Log File Storage" Microsoft Docs (May 3, 20140) [online] https://docs.microsoft.com/en-US/iis/manage/provisioning-and-managing-iis/managing-iis-log-file-storage (Access Date: Apr. 1, 20205); 9 pages.

Wang, P., et al., "An Advanced Hybrid Peer-to-Peer Botnet", School of Electrical Engineering and Computer Science, University of Central Florida, IEEE (Jul. 2008); 15 pages.

Yin, H., et al., "Panorama: capturing system-wide information flow for malware detection and analysis", Proceedings of the 14th ACM conference on Computer and Communications Security (Oct. 2007); 12 pages. DOI/10.1145/1315245.1315261.

Zhu, N., et al., "Design, Implementation, and Evaluation of Repairable File Service", Proceedings of the 2003 International Conference on Dependable Systems and Networks (2003); 10 pages.

Non-Final Office Action for U.S. Appl. No. 17/746,471 mailed Sep. 9, 2024, 30 pages.

* cited by examiner

1100

```
Receive, via an interface, a natural language request for performing an identified
task in a management system, the management system being associated with a set
of system commands, the set of system commands being configured to perform
one or more computational tasks associated with the management system, the
identified task being from the one or more computational tasks, and the
management system operating within an identified context 1171
```

↓

Extract, based on the identified context, a set of features from the natural language request 1172

↓

Provide the set of features to a first machine learning (ML) model to infer a template command based on the natural language request, the first ML model trained using first training data, the first training data including a set of natural language phrases associated with the context, the first ML model trained to receive features based on the set of natural language phrases as input, the template system command being associated with a set of system commands 1173

↓

Receive, as output from the first ML model, the template command associated with the natural language request 1174

↓

Provide the final command as a reference input to a second ML model, the second ML model configured to generate a set of natural language phrases semantically related to the reference input 1175

↓

Receive, from the second ML model, the set of natural language phrases semantically related to the reference input 1176

↓

Generate a second training data based on the set of natural language phrases semantically related to the reference input 1177

↓

Augment the first training data by adding the second training data to the first training data to generate third training data 1178

↓

Provide the final command to the management system to implement the identified task 1179

FIG. 11

```
[
  { "alert": "event, case, incident, occasion, incidence, affair, interlude"},
  { "severity": "sensitivity, risk, acuteness, seriousness, severeness, gravity, danger" },
  { "severity": { "high": "risky, important, acute, serious, severe, extreme, important"}},
  { "severity": { "medium": "median, mean, average, medium, ordinary, common, midpoint"}},
  { "severity": { "low": ", small, little, unimportant, mild, slight, modest, soft"}},
  { "host": "server, machine, pc, desktop, notebook, phone, box"},
  { "occurred": "happened"},
  { "related": "connected"},
  { "the number of": "how many"}
]
```

FIG. 13A tell me the number of incidences reported from xps servers => {"api": "query_alert", "host": "XPS", "count": true} select the number of interludes reported from xps servers => {"api": "query_alert", "host": "XPS", "count": true} check the number of incidents reported from xps servers => {"api": "query_alert", "host": "XPS", "count": true} check the number of cases reported from xps servers => {"api": "query_alert", "host": "XPS", "count": true} number of low severity occasions on frontend_p2 machine => {"api": "query_alert", "host": Frontend_P2, "severity": "low", "count": true} number of low severity incidents on frontend_p2 machine => {"api": "query_alert", "host": Frontend_P2, "severity": "low", "count": true} number of low severity events on frontend_p2 machine => {"api": "query_alert", "host": Frontend_P2, "severity": "low", "count": true} number of low severity incidences on frontend_p2 machine => {"api": "query_alert", "host": Frontend_P2, "severity": "low", "count": true} number of low severity occasions on frontend_p2 machine => {"api": "query_alert", "host": Frontend_P2, "severity": "low", "count": true} look low severity interludes occurred in the past three weeks on webprod hosts => {"api": "query_alert", "start_time": "3 weeks", "severity": "low", "host": "WebProd"} get low severity interludes occurred in the past three weeks on webprod hosts => {"api": "query_alert", "start_time": "3 weeks", "severity": "low", "host": "WebProd"} query low severity affairs occurred in the past three weeks on webprod hosts => {"api": "query_alert", "start_time": "3 weeks", "severity": "low", "host": "WebProd"} check low severity incidences occurred in the past three weeks on webprod hosts => {"api": "query_alert", "start_time": "3 weeks", "severity": "low", "host": "WebProd"} show me low severity incidences occurred in the past three weeks on webprod hosts => {"api": "query_alert", "start_time": "3 weeks", "severity": "low", "host": "WebProd"} the number of high severity events occurred in the past 2 days on 123.34.23.1 => {"api": "query_alert", "start_time": "2 days", "severity": "high", "host": "123.34.23.1", the number of high severity incidents occurred in the past 2 days on 123.34.23.1 =< {"api": "query_alert", "start_time": "2 days", "severity": "high", "host": "123.34.23.1", the number of high severity events occurred in the past 2 days on 123.34.23.1 => {"api": "query_alert", "start_time": "2 days", "severity": "high", "host": "123.34.23.1", the number of high severity cases occurred in the past 2 days on 123.34.23.1 => {"api": "query_alert", "start_time": "2 days", "severity": "high", "host": "123.34.23.1", the number of high severity affairs occurred in the past 2 days on 123.34.23.1 => {"api": "query_alert", "start_time": "2 days", "severity": "high", "host": "123.34.23.1", check events which were connected to database host and occurred between may/06 and june/30 => {"api": "query_alert", "start_time": "May/06", "end_time": "Jun/30", "host":

retrieve affairs which were connected to database host and occurred betwwen may/06 and june/30 => {"api": "query_alert", "start_time": "May/06", "end_time": "Jun/30", "host"

FIG. 13B

| Input | Predicted output | Correct output |
| --- | --- | --- |
| List alerts for the last six hours | {"api": "query_alert", "start_time": "6 hours"} | {"api": "query_alert", "start_time": "6 hours"} |
| What were the most important alerts from the last fortnight of 2021 | {"api": "query_alert", "start_time": "12/17/2021", "end_time":"1/1/2022"} | {"api": "query_alert", "start_time": "12/17/2021", "end_time":"12/31/2021"} |
| Show all alerts related to ransomware | {"api": "query_endpoint_behavior", "start_time": "6 hours"} | {"api": "query_alert", "start_time": "6 hours", "alert_type": "ransomware"} |

FIG. 15

Show me all alerts => {"api": "query_alert"}
1
2
3
4
5

List high severity alerts => {"api": "query_alert", "severity": "high"}
1
2
3
4
5

List alerts for SandCat threat => {"api": "query_alert", "threat_name": "SandCat"}
1
2
3
4
5

List alerts for the last six hours => {"api": "query_alert", "start_time": "6 hours"}
1
2
3
4
5

Alerts occurred between the past two weeks and last 4 days => {"api": "query_alert", "start_time": "2 weeks", "end_time": "4 days"}
1
2
3
4
5

List alerts for demo hosts => {"api": "query_alert", "host": "demo"}
1
2
3
4
5

Show me the number of low severity alerts => {"api": "query_alert", "severity": "low", "count": true}
1
2
3
4
5

Show me low severity alerts occurred in the past three weeks on WebProd hosts => {"api": "query_alert", "start_time": "3 weeks", "se
1
2
3
4
5

FIG. 16

METHODS AND APPARATUS FOR NATURAL LANGUAGE INTERFACE FOR CONSTRUCTING COMPLEX DATABASE QUERIES

BACKGROUND

The embodiments described herein relate to methods and apparatus for natural language-based querying or manipulating cybersecurity management systems that are used to monitor hardware, software and/or communications for virus and/or malware detection to ensure data integrity and/or to prevent or detect potential attacks.

The embodiments described herein relate to methods and apparatus for receiving natural language tasks and converting them to complex commands and/or queries for manipulating cybersecurity management systems using Machine Learning (ML) models. The embodiments described herein relate to methods and apparatus for training the ML models using training data, and generating and/or augmenting the training data to improve performance of the ML models at inferring complex commands from natural language phrases.

Some known malicious artifacts can be embedded and distributed in several forms (e.g., text files, audio files, video files, data files, executable files, uniform resource locators (URLs) providing the address of a resource on the Internet, etc.) that are seemingly harmless in appearance but hard to detect and can be prone to cause severe damage or compromise of sensitive hardware, data, information, and/or the like. Management systems, for example, cybersecurity systems, can be configured to manage network or digital security of data and/or computational resources (e.g., servers, endpoints, etc.), often associated with organizations. Such management systems can be complex and configured to monitor endpoints, artifacts associated with endpoints, and communications between endpoints, to scan for potentially malicious artifacts or activities. Interacting with the management systems can be complicated and time consuming and often associated with a steep learning curve for users. Thus, there exists a need for methods and apparatus to implement an intuitive, efficient, and user-friendly interface for users to interact with and manipulate managements systems.

SUMMARY

According to an aspect of the present disclosure, an apparatus includes a memory and a processor. The processor is operatively coupled to the memory. The processor is configured to receive, via an interface, natural language data associated with a user request for performing an identified computational task associated with a cybersecurity management system. The processor is configured to provide the natural language data as input to a machine learning (ML) model. The ML model is configured to automatically infer a template query based on the natural language data. The processor is further configured to cause the template query to be displayed, via the interface. The template query is editable by a user. The processor is further configured to receive, via the interface, user input indicating a finalized query associated with the identified computational task, and to provide the finalized query as input to a system configured to perform the identified computational task. The processor is further configured to modify a security setting in the cybersecurity management system based on the performance of the identified computational task.

In some embodiments, a non-transitory processor-readable medium stores code representing instructions to be executed by a processor. The instructions include code to cause the processor to receive, via an interface, a first portion of a natural language request. The first portion of the natural language request indicates a context associated with a task to be performed via a management system. The instructions include code to cause the processor to provide, the first portion of the natural language request to a first machine learning (ML) model. The first ML model is configured to predict from the portion of the natural language request and the context, a set of options. Each option from the set of options indicates a second portion of the natural language request to generate a complete natural language request. The instructions further include code to cause the processor to invoke a display of the set of options as a selectable list via the interface. The instructions further include code to cause the processor to receive, via the interface, a selection of an option from the set of options to generate a complete natural language request to perform an identified task. The instructions further include code to cause the processor to provide the complete natural language request as an input to a second ML model, and generate, using the second ML model, a template query based on the complete natural language request. The template query is configured to infer the task to be performed via the management system. The instructions further include code to cause the processor to receive confirmation of the inferred task to be performed via the management system, and implement the task via the management system.

In some embodiments, a method includes receiving, via an interface, a natural language request for performing an identified task in a cybersecurity management system. The method includes parsing the natural language request into a set of portions to predict a template query using a machine learning (ML) model. The prediction is based on the natural language request. The template query includes the set of portions. Each portion from the set of portions is associated with a parameter from a set of parameters. The method further includes displaying, via the interface, the set of portions of the template query. The interface is configured to receive changes, provided by a user, to a portion from the set of portions of the template query to form a finalized query. The method further includes providing the finalized query to the cybersecurity management system to implement the identified task.

BRIEF DESCRIPTION OF THE DRAWINGS

FIG. 11 is a flowchart showing a method of implementing an NL interface, and augmenting training data to train Machine Learning (ML) model(s) to infer a query or command, using an NL analysis device, according to an embodiment.

FIG. 13A shows an example representation of generating supplemental training data, using deterministically encoded synonyms, to infer a natural language query or command, using an NL analysis device, according to an embodiment.

FIG. 13B shows an example representation of generating supplemental training data, using deterministically encoded synonyms, to infer a natural language query or command, using an NL analysis device, according to an embodiment.

FIG. 15 shows a table of example natural language phrases and a comparison between inferred intent predicted by an NL analysis system, represented by predicted output, and true intent represented by correct output.

FIG. 16 shows example input forms to receive user provided natural language phrases to use while implementing an NL interface, and augmenting training data to train Machine Learning (ML) model(s) to infer a query or command, using an NL analysis device, according to an embodiment.

DETAILED DESCRIPTION

Figure 1:
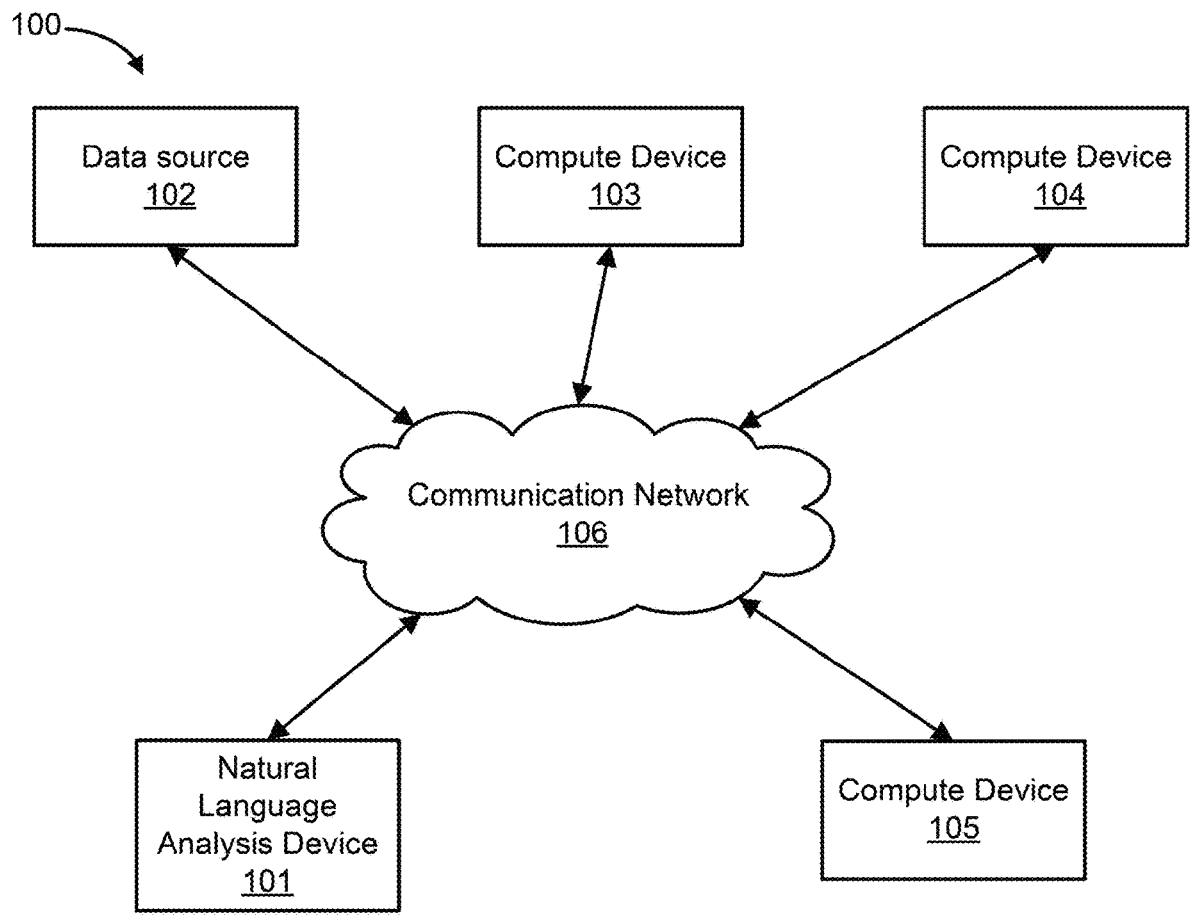
FIG. 1 is a schematic block diagram of natural language (NL) analysis system for manipulating management systems using a natural language interface (NLI), according to an embodiment.

In some embodiments, an apparatus includes a memory and a processor operatively coupled to the memory. The processor is configured to receive, via an interface, natural language data associated with a user request for performing an identified computational task associated with a cybersecurity management system. The processor is configured to provide the natural language data as input to a machine learning (ML) model. The ML model is configured to automatically infer a template query based on the natural language data. The processor is further configured to cause the template query to be displayed, via the interface, the template query being editable by a user. The processor is further configured to receive, via the interface, user input indicating a finalized query associated with the identified computational task, and to provide the finalized query as input to a system configured to perform the identified computational task. The processor is further configured to modify a security setting in the cybersecurity management system based on the performance of the identified computational task.

In some embodiments, a non-transitory processor-readable medium stores code representing instructions to be executed by a processor. The instructions include code to cause the processor to receive, via an interface, a first portion of a natural language request, the first portion of the natural language request indicating a context associated with a task to be performed via a management system. The instructions include code to provide the first portion of the natural language request to a first machine learning (ML) model. The first ML model is configured to predict from the portion of the natural language request and the context, a set of options. Each option from the set of options indicates a second portion of the natural language request to generate a complete natural language request. The instructions further include code to invoke a display of the set of options as a selectable list via the interface. The instructions further include code to receive, via the interface, a selection of an option from the set of options to generate a complete natural language request to perform an identified task. The instructions further include code to provide the complete natural language request as an input to a second ML model, and generate, using the second ML model, a template query based on the complete natural language request. The template query is configured to infer the task to be performed via the management system. The instructions further include code to receive confirmation of the inferred task to be performed via the management system, and implement the task via the management system.

In some embodiments, a method includes receiving, via an interface, a natural language request for performing an identified task in a cybersecurity management system. The method includes parsing the natural language request into a set of portions to predict a template query using a machine learning (ML) model. The prediction is based on the natural language request. The template query includes the set of portions. Each portion from the set of portions is associated with a parameter from a set of parameters. The method further includes displaying, via the interface, the set of portions of the template query. The interface is configured to receive changes, provided by a user, to a portion from the set of portions of the template query to form a finalized query. The method further includes providing the finalized query to the cybersecurity management system to implement the identified task.

Malicious software, otherwise referred to as malware, can be intrusive software designed to damage, destroy, or cause harm to computers, computer systems, users, or other entities associated with the computer systems. Malware can be distributed via artifacts including computer files ("computer file(s)" or "file(s)") such as text or document files (collectively, "document file(s)") of various filetypes, distributed or communicated via internet communications serving as a common delivery mechanism for malware, and/or the like. For example, document files can include embedded, executable scripts or macros that, in some cases, can be configured to cause malicious activity on a host device (e.g., a computer) or in a host environment (e.g., of a computer, virtual machine, etc.). Malware can also be associated with a variety of artifacts including uniform resource locators (URLs), Internet Protocol addresses (IPs), computer processes, registry entries, and the like, which may be used, generated, or modified to mediate malware distribution and/or execution. Examples of common malware include viruses, worms, Trojan viruses, spyware, adware, and ransomware.

Communications, artifacts, compute devices, servers, and/or hosts can be considered compromised due to being associated with malware and can be identified as potentially malicious. Management systems, for example, cybersecurity management systems, can often be configured to monitor, evaluate, manage, and/or maintain activity or security associated with communications, artifacts, compute devices, data storage devices, servers, and/or hosts of that are of interest. In some instances, management systems can be configured to be in communication with compute devices, servers, data sources, data storage devices, hosts, and can maintain a schedule of scanning the various devices or sources and reporting the results for maintenance of security. For example, management systems can be configured to run regularly scheduled scans on compute devices, and/or receive predetermined, regularly scheduled check-in communications from one or more compute devices. In some instances, management systems can be configured to send data, information, signals, or messages to the devices (e.g., compute devices), sources, servers, etc. In some instances, for example, management systems can manage usage policies in a set of compute devices, and manage installation, in the set of compute devices, of security software such as firewalls or antivirus software. A management system can receive, for example, via firewalls installed in the compute devices, messages or data associated with the state of the compute devices related to activity, any deviations in activity profiles detected, security levels maintained or not maintained, threats detected, web threats blocked, any changes or breaches in policies, etc., and/or generate alerts or summary reports for further analysis. Management systems can be configured to set policies, for example, operational policies associated with permissions for specific users to access specified portions of a compute device, communication device, and/or a data storage. Management systems can be configured to set security policies associated with data transfer, communication of information, or day-to-day activity of one or more compute devices under the management of the management system. Management systems can be configured to send messages or data to the compute devices to permit or block activity at a compute device, for example, communications to or from the device. Management systems can be configured to permit or block activity of one or more users, entities, communications involving one or more hosts, and/or the like.

Management systems, however, can be highly complex and intricate in configuration, and therefore hard to navigate and/or manipulate. Management systems can use complex system commands for each particular task. For example, manipulation of complex management systems—like cybersecurity management systems—can be conventionally done via generating and using complex queries or system commands that are part of a technical language of communication compatible with the management system. The complex queries or system commands can include complex and/or non-intuitive system terms, coined together using complex non-intuitive syntactical requirements, that may involve high levels of training, knowledge, and proficiency of the complex systems and it's specific functionalities and technical language of operation. Maintaining specific knowledge of operation of such complex systems can be challenging especially when operating with transition teams of human users. Moreover, the process of training personnel to operate or manipulate such complex management systems may involve a steep learning curve with inefficiencies in procedures that may be prone to costly user errors. Conventionally, users intending to manipulate complex management systems have to be trained to identify functions either from memory or from complex function listings, navigation and use of which can be laborious, time consuming and require specialized knowledge gained through extensive training in the specific technical language used to manipulate the management system. Efforts to use natural language processing to operate systems have pursued chat bot applications that use a question-answer form of obtaining information from a user. Such applications, however, are convoluted in their path to achieve a target goal of inferring intent. They can be time consuming and prone to errors leading into undesired paths before a user may eventually call a help function. Such chat-bot applications therefore are not intuitive and user friendly and therefore do not suit the implementation of providing access to a complex management system that is operated through complicated non-intuitive function calls or system commands used in complex combinations to achieve a specified goal. Thus, there exists a need for methods and apparatus to simplify operation and manipulation of complex management systems in a user-friendly, and intuitive manner, such that efficiencies of training and day-to-day operation of complex managements systems can be increased while achieving low operator errors and high-quality management.

In some implementations, simplifying operation and manipulation of a management system can include implementing an interface between users and the complex management system, such that users can use natural language phrases (i.e., phrases from a human spoken language that has, for example, developed naturally in human use, instead of learning complex queries). FIG. 1 is a schematic representation, as a block diagram, of a natural language (NL) analysis system 100 for implementing a natural language interface to simplify operating and manipulating complex management systems, according to one embodiment.

The NL analysis system 100, also referred to herein as "an analysis system" or "a system," is configured to define and implement a natural language interface, "also referred to herein as "NL interface" or "interface". The NL interface is configured to receive a natural language request or phrase from a user with an intent to perform an identified task via the complex management system. The NL interface is configured to provide the natural language request or phrase to a computational model, for example, one or more machine learning (ML) models, also referred to herein in general as an ML model, that is trained, via context-based learning, to transform natural language requests or phrases into complex queries or system commands compatible with the complex management system. For example, the ML model can transform a natural language request into an intermediate template query, using a rule based or table-based approach. The template query can be finalized with user input, and then translated into a complex SQL query. For example, the ML model can be trained, using training data, to generate complex queries based on the natural language request or phrase provided by predicting the user's intent to perform the task.

The NL interface is configured to display, to the user, the predicted intent and/or the predicted query as a template query, and receive user adjustments or corrections to the predictions. In some embodiments, the NL system is configured to receive, via the NL interface, user provided corrections and provide the corrections to augment the training data used to train the ML model. Using the augmented training data, including the user provided corrections, the ML model can be retrained to improve its performance in predicting intent of the user, and generating the template query to match or be closer to the user's intent when provided with the natural language request or phrase, or when provided with the other similar and/or related natural language phrases or requests. In some implementations, the NL interface can be implemented as a web form using a suitable application programming interface (API). In some implementations, the NL interface can be implemented using standalone software.

In some embodiments, the NL system 100 can be configured to implement the NL interface such that a user can start typing in the natural language request or phrase and the NL system 100 can use an ML model to predict the user's intent mid-typing and offer auto-completion options from which the user can select. In some embodiments, the NL system 100 is configured to receive, via the NL interface, user provided selection of an auto-complete option from a list of potential options, and provide the user selection of the option to augment the training data used to train the ML model used to generate the auto-completion options. In some implementations, the functionality of auto-completion can be selectable by the user via a control tool provided in the NL interface (e.g., a check box or a radio button) that can be selected to indicate that a user would prefer to activate auto-completion and be provided with options from which to choose. In some instances, the selectable variation of auto-completion can change with user preferences and can be saved as user profiles associated with the NL interface (e.g., user profiles linked to specific users having a specific experience or familiarity with the management system and/or specific authentication privileges). In some instances, the NL analysis device can be configured such that the options provided for selection to implement auto-completion can be based on the user profile.

In some embodiments, the NL analysis system 100 can implement auto-correction. For example, the NL system 100 can use an ML model to predict the user's intent mid-typing and offer auto-correction options from which the user can select or can provide the best match option, correct typographical errors, correct misspellings, and/or the like. In some implementations, the functionality of auto-correction can be selectable by the user via a control tool provided in the NL interface (e.g., a check box or a radio button) that can be selected to indicate that a user would prefer to activate auto-correction and be provided with options from which to choose. In some instances, the selectable variation of auto-correction can change with user preferences and can be saved as user profiles associated with the NL interface (e.g., user profiles linked to specific users having a specific experience or familiarity with the management system and/or specific authentication privileges). In some instances, the NL analysis device can be configured such that the options provided for selection to implement auto-completion can be based on the user profile.

Using the augmented training data, including the user provided selection, the ML model can be retrained to improve its performance in predicting the correct auto-completion option or list of options, and/or rank ordering the list of options based on the training data such that the list of options for auto-completion presented to the user is based on the rank ordering when provided with an incomplete natural language phrase or request that is the same or similar and/or related to the natural language phrase or request for which the user provided the selection. In some implementations, the NL system 100 can implement auto-completion using the same ML model as the ML model used for inferring intent of the user. In some implementations, the NL system 100 can implement inferring the user's intent via a first ML model and the NL system can implement auto-completion using a second ML model different than the first ML model.

In some embodiments, as described herein, the NL system 100 can be used to augment the training data using several methods including generating supplemental training data based on user selections associated with auto-completion of an incomplete natural language query (also reference to herein as request or command), generating supplemental training data based on user corrections associated with inference of user intent and generation of a template query, and generating supplemental training data based on a reference natural language query by forming new natural language phrases or queries with combinations of synonyms associated with the words in the reference natural language query. The supplemental training data based on a reference natural language query can be generated using human-based approaches, machine-based approaches, and combination or hybrid approaches, as described herein.

The NL analysis system 100 includes a natural language (NL) analysis device 101 (also referred to herein as "analysis device"), data source 102, and compute devices 103-105, each connected to the other via a communication network 106, as illustrated in FIG. 1. While the system 100 is illustrated to include a data source 102 and three compute devices 103-105, a similar analysis system can include any number of data sources and/or any number of compute devices.

The NL analysis device 101 of the system 100 can be configured to receive data from the data source 102 via the communication network 106. The NL analysis device 101 can receive, from the data source 102, any suitable information associated with processing natural language data including one or more natural language corpuses, training data used to train ML models to infer intent of a user based on natural language phrases, priming data configured to provide context based information to prime ML models trained on general natural language corpuses to be adapted to context based learning associated with a particular context (e.g., cybersecurity, threat management, etc.), and/or the like.

The NL analysis device 101 can be configured to receive training data from the data source 102 and to define, train, and/or prime one or more ML models to auto-complete and/or auto-correct a user's query in a natural language regarding completion of a task via a management system, infer the user's intent to complete the task via the management system and/or to generate supplemental training data to augment the training data received from the data source such that the ML models can be retrained for improved performance (at auto-completion, auto-correction, and/or intent inference) under additional context-based learning paradigms.

The data source 102 can be any suitable source of data providing information associated with a large body of text in any suitable natural language (e.g., English, Spanish, French, German, etc.) used for human communication. In some implementations, the data can include suitable annotations that can be used to inform the type of data, use, and/or any other suitable supplemental information or statistic associate with the data (e.g., word statistics, part-of-speech tagging, lemma or base form of a word, gloss including brief explanations, definitions, pronunciations etc. (e.g., interlinear gloss between two or more languages in a bilingual or multilingual relationship), any suitable structural organization or analysis associated with the text including any information associated with parsing the text, and/or other suitable linguistic features or analytical notes such as morphology, semantics, pragmatics, synonyms, etc. In some implementations, the data source 102 can directly provide an ML model trained in an identified corpus of text.

The compute devices 103-105 can include any suitable hardware-based computing devices and/or a multimedia devices, such as, for example, a server, a desktop compute device, a smartphone, a tablet, a wearable device, a laptop and/or the like. The compute devices 103-105 can include a user device configured to connect to the NL analysis device 101 and/or the data source 102, as desired by an authorized or authenticated user. In some implementations, the compute device 105 can be configured to implement and/or present the interfaces described herein, for example the interface 550, 650, 950, or 1050. For example, the compute device 103 can be used to present an NL interface provided by the NL analysis device 101, to receive the user's natural language phrase or request, provide auto-completion and/or auto-correction options, receive user selections of one option for the auto-completion and/or auto-correction, provide a template query in response to a complete natural language query indicating portions defined using parameters, receive user corrections to the template query, and accept the final query that is then used to invoke the management system to perform the desired task, as discussed in further detail herein. One or more of the compute devices 103-105 can interact with the analysis device 101 to receive and/or send signals/communications from and/or to the analysis device 101 to exchange data with the analysis device 101.

In some embodiments, the NL analysis device 101, also referred to herein as "the analysis device", or "the NL device", or simply "the device", can be used to implement processes or components configured to collect the data from the data source 102, organize and/or normalize the data according to a predetermined organizational structure, and generate or augment training data used to train ML models to receive natural language phrases and auto-correct, auto-complete, and/or infer intent based on the natural language phrases. The NL analysis device 101 can implement the one or more ML models for auto-correction, auto-completion, and/or inference of a user's intent based on natural language phrases receive via an NL interface. In some embodiments, the NL analysis device 101 can implement an interface (e.g., a NL interface or a user interface to interact with the analysis device using natural language) configured to provide one or more tools to receive natural language phrases from a user and provide the natural language phrases to the one or more ML models to auto-complete, auto-correct, and/or infer intent and predict a template query. The NL analysis device 101 can receive user selections based on the auto-completion and/or receive user corrections when presented with the template query, and use the user selections and/or user corrections to generate supplemental training data to segment the training data used to train the one or more ML models for auto-completion, auto-correction, intent inference or other refinement of a query, and/or generation of natural language phrases based on reference samples to augment training data. The NL analysis device 101 can train the ML models using training data or retrain the ML models using the augmented training data to improve performance.

In some implementations, the NL analysis device 101 can be configured to receive instructions and execute system commands to the management system that the user is attempting to manipulate or operate. For example, the NL analysis system 101 can receive user instructions in the form of an approved final query or command that is generated based intent inference in combination with user corrections to the template query. Based on the instructions, and based on the approved final query or command, the NL analysis device 101 can send an appropriate system command that is compatible with the management system to invoke the management system and/or to perform the desired task via the management system. In some implementations, the NL analysis device 101 can evaluate the performance of the one or more ML models and improve the performance as needed by, for example, seeking and obtaining specific supplemental training data and/or retraining the ML models using augmented training data using the supplemental training data. The NL analysis device 101 can be configured to perform actions based on analysis of data. For example, the task to be performed via the management system can include generating summary of analytical data related to states of security associated with one or more endpoints under the management of the management system. Based on the summary, the NL analysis device 101 can receive instructions from a user and perform one or more actions such as send message to endpoints, block or permit communications between endpoints or servers, quarantine an endpoint, generate, and send an alert to a user regarding a status of one or more endpoints, and/or the like.

Figure 2:
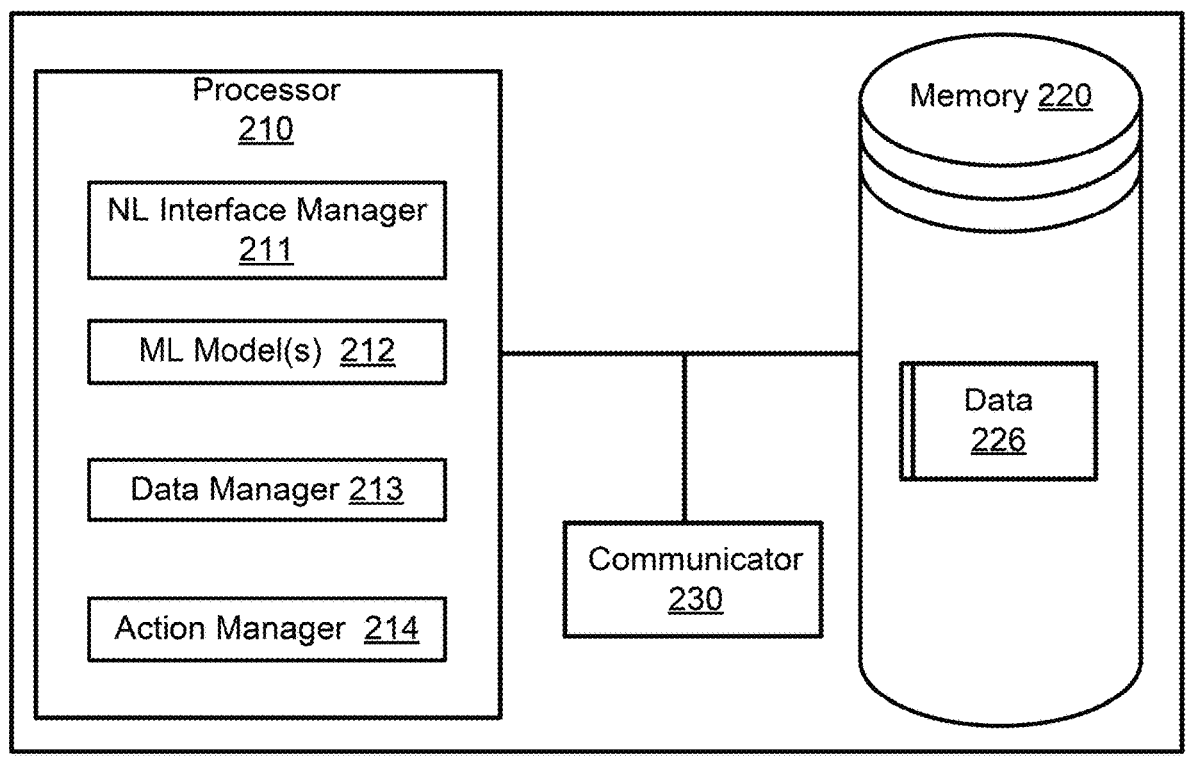
FIG. 2 is a schematic block diagram of an NL analysis device for manipulating management systems using a natural language interface (NL interface), according to an embodiment.

FIG. 2 is a schematic representation, of an NL analysis device 201, of an NL analysis system similar to the NL analysis system 100 shown in FIG. 1. The NL analysis device 201 can be substantially similar in structure and/or function to the NL analysis device 101 of FIG. 1. The NL analysis device 201 can be a hardware-based computing device, a multimedia device, or a cloud-based device such as, for example, a compute device, a server, a desktop compute device, a laptop, a smartphone, a tablet, a wearable device, a remote computing infrastructure, and/or the like. The NL analysis device 201 includes a processor 210, a memory 220 and a communicator 230. The NL analysis device 201 is depicted in FIG. 2 to have one processor, one memory, and one communicator for illustrative purposes only, and a similar analysis device can include any number of processors, memories, and/or communicators, in any suitable configuration.

The NL analysis device 201 can be configured to receive data from data sources (e.g., data source 102 of system 100 shown in FIG. 1) and/or compute devices (e.g., compute devices 103-105 of system 100 in FIG. 1) via the communicator 230 (e.g., operatively coupled to a communication network, such as communication network 106 of FIG. 1). In some instances, NL analysis device 201 can be configured to implement the management system or communicate with a compute device that implements the management system. In some instances, the NL analysis device 201 can implement an NL interface to receive natural language instructions and transform the natural language instructions into system commands compatible with the management system to perform one or more system tasks via the management system. In some instances, the NL analysis device 201 can implement the management system, and provide a natural language go-between to receive natural language requests from a compute device presenting the NL interface. In some implementations, the NL analysis device 201 can implement the management system and the NL interface. In some implementations, the NL analysis device can be in communication with a device implementing the management system (e.g., a server) and send instructions to the device based on the natural language phrases received via the NL interface. The data received from data sources and/or compute devices can be stored in the memory 220 and accessed by the processor 210 to implement an NL interface and/or to build, train, or retrain one or more ML models to auto-complete, auto-correct, and/or infer intent of a user's natural language phrases to manipulate a management system, as described herein.

The memory 220 of the analysis device 201 can be, for example, a random-access memory (RAM), a memory buffer, a hard drive, a read-only memory (ROM), an erasable programmable read-only memory (EPROM), and/or the like. The memory 220 can store, for example, one or more software modules and/or code that can include instructions to cause the processor 210 to perform one or more processes, functions, and/or the like (e.g., NL Interface Manager 211, ML model(s) 212, Data Manager 213, and Action Manager 214, shown in FIG. 2). In some implementations, the memory 220 can be a portable memory (e.g., a flash drive, a portable hard disk, and/or the like) that can be operatively coupled to the processor 210. In some instances, the memory can be remotely operatively coupled with the NL analysis device 201, for example, via the communicator 230. For example, a remote database server can be operatively coupled to the NL analysis device 201.

The memory 220 can store data 226. The data 226 can include data received from data sources (e.g., data sources 102 of system 100 in FIG. 1). As described with reference to the data source 102 and the analysis device 101 of system 100, the data received by the NL analysis device 201 from data source can include information associated with ML models (e.g., data associated with one or more ML models configured to auto-correct, auto-complete and/or infer intent from natural language phrases, or generate natural language phrases based on reference phrases provided as stimulus). The data received from data sources can include training data, including natural language data associated with large corpuses (e.g., those used in corpus linguistics, machine learning in natural language processing, etc.). The data can include context specific training data (e.g., training data directed to the context of cybersecurity) to prime one or more ML models to auto-correct, auto-complete, infer intent from natural language phrases, and/or generate natural language phrases based on a reference phrase provided as stimulus to augment training data. The training can be conducted using the context of cybersecurity and/or the context of manipulating the desired management system. For example, the data 226 can include data associated with English language associated with the context of cybersecurity and malware threat detection/threat mitigation using a cybersecurity management system.

The data 226 can include data received from compute devices (e.g., compute devices 103-105 of system 100 in FIG. 1). The data 226 can include information or messages received from one or more compute devices indicating a state of the compute device(s) or a state of data associated with the compute device(s). For example, a security state reported by a firewall installed in the compute device), policies associated with the compute device(s), a state of activity associated with the compute device(s) and duration in that state (including authorized or unauthorized access to various portions of the compute device), any potential violations to policies instituted by the management system over the compute device(s) that were blocked, any threats detected, indications of a level of threat if identified (e.g., high level, medium level, low level threats), any indication of potential malware identified by the compute device(s), any threats blocked by the compute device(s) or by the management system (e.g., web threats faced by the compute device), type of protection associated with each compute device, type of device or other device related information (e.g., is it an endpoint, server, mobile device, etc.), level of encryption associated with the compute device(s), security profile associated with the compute device(s), third-party software or applications used by the compute device(s), security level associated with communications from and to the compute device(s) (e.g., protection of web or email messages), any other suitable information about hosts associated with the compute device(s), and/or users of the compute device(s) their user profiles, activity profiles, privileges, etc. and/or the like.

The data 226 can include data associated with (e.g., data used by, or data generated by) one or more processes, components, or routines implemented by the processor 210 to auto-complete, auto-correct, and/or infer intent from natural language phrases. For example, the data 226 can include data used by or associated with the NL interface manager 211, the ML model(s) 212, the data manager 213, and/or the action manager 214. For example, the data 226 can include data generated by the NL interface manager 211 to generate a natural language user interface that can be configured to provide a user with control tools that can be used to receive a complete or incomplete natural language phrase or query from the user. The data 226 can include data associated with receiving the complete or incomplete natural language phrase or query and providing information to the ML models 212. The data 226 can include outputs of the ML models, and based on the output of the ML models 212, data associated with implementing the auto-completion, auto-correction, and/or intent inference. The data 226 can include data associated with processes or components of the processor 210 used to parse the natural language phrase, generate a template query, and present the template query to the user in an editable format. The data 226 can include data associated with receiving user made corrections and/or user made selections, and generating a final query or command that can then be provided to the management system to perform the desired task. The data 226 can include supplemental training data generated based on the user made selections, the user made corrections, and/or reference phrases using combinatorial methods, by humans and/or machines, to augment the training data. The augmented training data can be used to retrain the ML model(s) 212 to improve their performance at auto-completion, auto-correction, and/or inference of intent from natural language phrases.

The data 226 can include data associated with the data manager 213 and/or the action manager 214, including messages or information to be sent to compute devices (servers, endpoints, etc.), actions recommend or performed by the NL analysis device 201, and/or other analyses, metrics or reports generated that may be visualized via the NL interface. In some instances, the action manager 214 can, for example, be configured to evaluate a performance of one or more ML models 212 and send recommendations and/or instructions to another component of the processor 210, for example, a process configured to train an ML model (not shown in FIG. 2) to seek a particular kind of augmented training data and use it to retrain one or more ML models 212. In some instances, the action manager 214 can be configured to send instructions and/or recommendations to external devices, for example, one or more compute devices, proxies, and/or servers (not shown in FIG. 2) to execute or carry out one or more actions based on the results of the action manager 214 (e.g., block communications, quarantine files or artifacts, retrain classifiers, discard data sources, etc.). In some instances, the action manager 214 can send instructions or recommendations to external devices using the communicator 230 and via a communication network (e.g., communication network 106 of system 100 in FIG. 1).

The communicator 230 can be a hardware device operatively coupled to the processor 210 and memory 220 and/or software stored in the memory 220 executed by the processor 210. The communicator 230 can be, for example, a network interface card (NIC), a Wi-Fi™ module, a Bluetooth® module and/or any other suitable wired and/or wireless communication device. The communicator 230 can include a switch, a router, a hub and/or any other network device. The communicator 230 can be configured to connect the analysis device 201 to a communication network (such as the communication network 106 shown in FIG. 1). In some instances, the communicator 230 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 230 can facilitate receiving and/or transmitting data, including natural language data, information associated with natural language data (e.g., information associated with auto-completion, auto-correction, parsing, and or intent inference based on natural language data), data associated with the management system to be manipulated, and/or other information, communication, or instructions through a communication network (e.g., the communication network 106 in the system 100 of FIG. 1). In some instances, received data can be processed by the processor 210 and/or stored in the memory 220 as described in further detail herein. In some instances, as described previously, the communicator 230 can be configured to send data collected and/or analyzed by one or more components of the processor 210 (e.g., the NL interface manager 211, the ML models 212, the data manager 213, and the action manager 214) to an external device (e.g., a server, a proxy, a compute device, etc.) of a NL analysis system (not shown in FIG. 1) to which the NL analysis device 201 is connected. The communicator 230 can also be configured to send data collected, analyzed, and/or generated by the processor 210 and the results of any analysis conducted by the processor 210. For example, communicator 230 can be configured to send/receive data generated as the result of interacting with users via an NL interface, data associated with auto-completion, auto-correction, and/or intent inference performed by the ML models 212, data associated with training the one or more ML models 212 to perform the auto-completion, auto-correction, and/or intent inference or query refinement, system commands and final queries or commands generated based on natural language queries or requests from users and used to operate and/or manipulate a management system, data associated with actions recommend or carried out by the processor 210 for example via the action manager 214, recommendations based on the evaluation of performance (e.g., to retrain an ML model, to block a source or communication, etc.) of a compute device, proxy, server, etc. associated with an NL analysis system to which the NL analysis device 201 is connected.

The processor 210 can be, for example, a hardware based integrated circuit (IC), or any other suitable processing device configured to run and/or execute a set of instructions or code. For example, the processor 210 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 210 is operatively coupled to the memory 220. In some embodiments, for example, the processor 210 can be coupled to the memory 220 through a system bus (for example, address bus, data bus and/or control bus). In some implementations, the processor 210 can include multiple processors.

The processor 110 includes and/or is configured to execute an NL interface manager 211, one or more ML models 212, a data manager 213, and an action manager 214. In some implementations, the NL interface manager 211, the ML models 212, the data manager 213, and/or the action manager 214 can be software stored in memory 220 and executed by processor 210. For example, code to cause the processor 210 to execute the NL interface manager 211, the ML models 212, the data manager 213, and/or the action manager 214 can be stored in the memory 220. In some implementations, the components can be hardware-based and implemented as a hardware device, such as, for example, an ASIC, an FPGA, a CPLD, a PLA, a PLC and/or the like.

The NL interface manager 211 can be configured to generate a user interface that can be used to receive natural language queries or phrases from a human user based on which the processor 210 can implement auto-completion, auto-correction, and/or intent inference, as described herein, to generate system commands compatible with a management system. The NL interfaces 550, 650, 950, and/or 1050 shown and described with reference to FIGS. 5-7, 9 and 10 are example interfaces that can be implemented by the NL interface manager 211. The NL interface is described in further detail herein with reference to FIGS. 5-7, 9 and 10.

Figure 5:
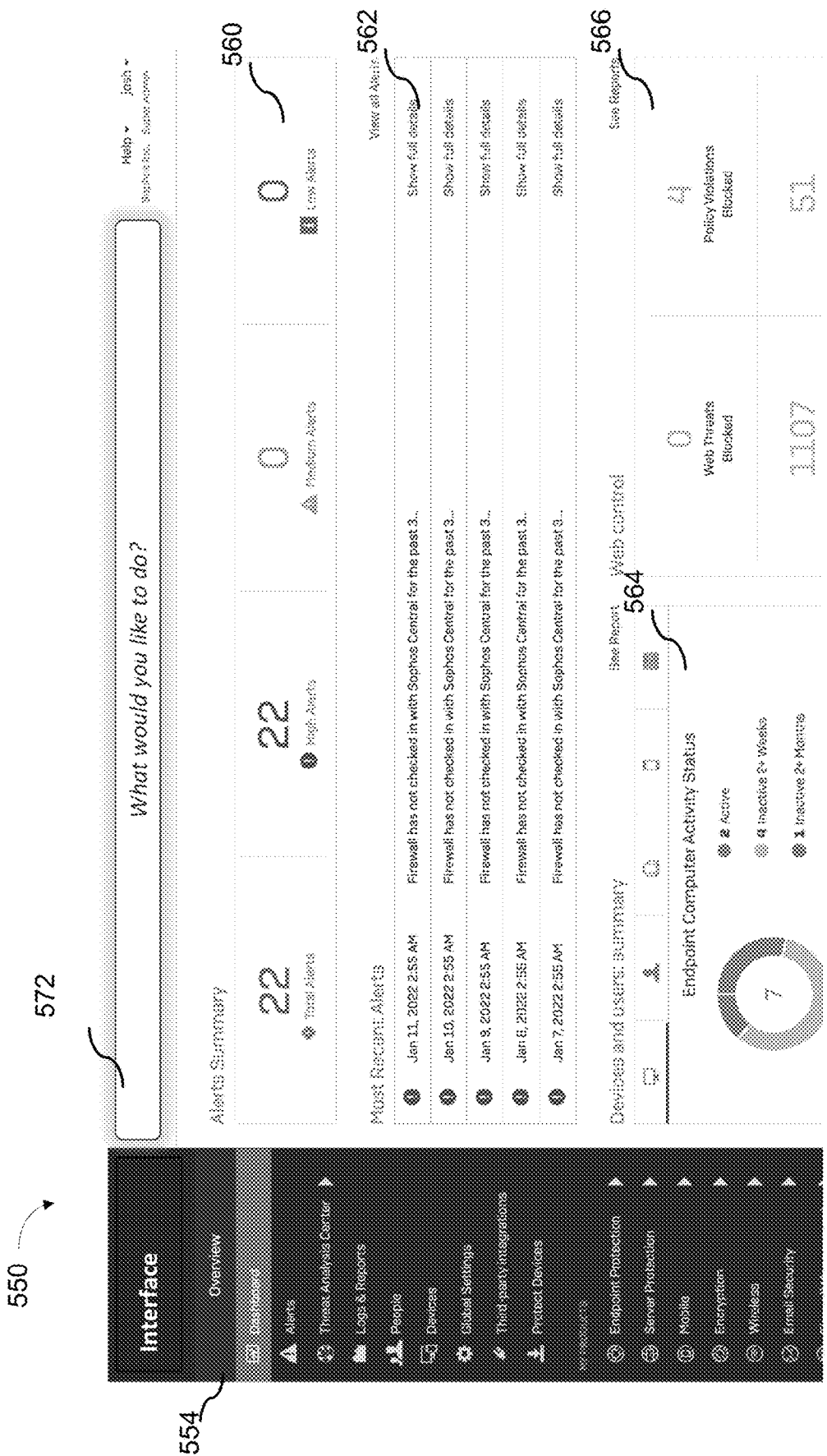
FIG. 5 shows an example NL interface implemented by an NL analysis device for manipulating a cybersecurity management system, according to an embodiment.

The NL interface manager 211 can be configured to generate the NL interface 550 in FIG. 5, for example, to provide control tools to receive natural language phrases or queries from a user indicating an intent to perform a task via a management system. For example, control tools can include an editable word processing section 572 to present a request for user input and to receive the user input. Other example control tools can include selectable, fillable, and/or clickable tools, or any other suitable interactive tool that can be operated by a human user. The NL interface manager 211 can be configured to populate the NL interface, for example, NL interface 550, with information that can associated with performing system tasks via the management system. For example, the NL interface 550 can be used to display summary information that can be obtained as results from executing system commands by providing natural language requests. The example shown in FIG. 5 includes results displayed in the interface 550 related to security monitoring conducted by a cybersecurity management system. As shown in FIG. 5, the NL interface 550 shows a first summary 560 of alerts generated in the system, with categories of alerts as high, medium, and low level of threat. The NL interface 550 shows, in a second summary 562, a list of recently received alerts in the high threat level category, with the time stamp of each alert received. In a third summary 564, the NL interface 550 shows endpoint activity status indicating how many endpoints managed by the management system were active and how many were inactive, and for what period of time. Other options of summary information can be obtained by selecting tabs for example to view a summary of user activity associated with each endpoint or a group of endpoints, etc. The fourth summary 566 shows a count of web threats blocked by the management system and a number of policy violations blocked the management system. Each summary is associated with a control tool to invoke generation of a report for review and further analysis. Each of these summaries, reports, and/or the information used to generate the summaries/reports can be populated using natural language phrases via the NL interface 550 by a user input of a natural language request at the editable text space 572.

Figure 6:
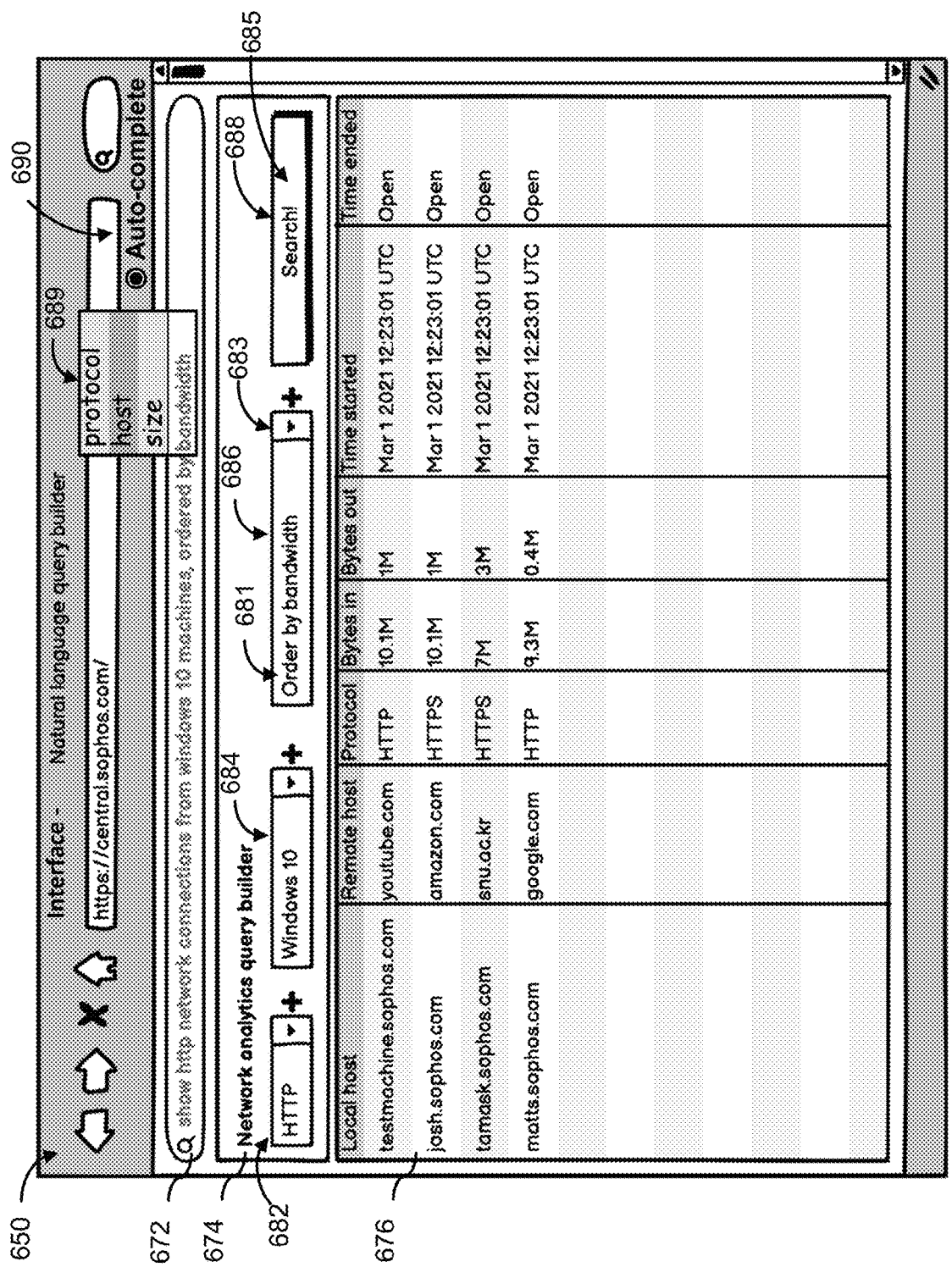
FIG. 6 shows an example NL interface implemented by an NL analysis device, and phases of interactions via the NL interface for manipulating a cybersecurity management system, according to an embodiment.

In some implementations, the NL interface manager 211 can be configured to generate the NL interface 650 in FIG. 6, for example, to provide an editable word processing or text section/space 672 to present a request for user input and to receive the user input. In some implementation, the NL interface 650 can include a control tool 690 (e.g., a selectable button) that can be configured to activate auto-completion of natural language phrases/requests, when selected, as a user enters an NL request. As shown in FIG. 6, if the control tool 690 is selected, the text space 672 can receive an incomplete portion of a user's input of a natural language phrase and use one or more ML models to predict options that can be used to complete the natural language request. The NL interface 650 can then present the options in a selectable list 689 (e.g., a list of attributes based on which http network connection from windows 10 machines can be ordered, the list including options "protocol", "host", "size", and "bandwidth"). As shown, one option (e.g., "bandwidth") can be selected by the user to auto-complete the natural language request in the text space 672. In some implementations, the NL interface can include a selectable control tool (not shown in FIG. 6) configured to activate auto-correction. When selected, the NL interface manager 211 can be configured to provide a list of options to auto-correct a misspelling, typographical error, grammatical/syntactical error, etc. of a typed natural language request from which a user may select an option. Alternatively, The interface manager 211 may be configured such that when selected the auto-correct function may be implemented to automatically identify misspellings or errors and correct them, and a user may undo the change if undesired which can be taken as an indication of user made correction (and used to augment training data to improve performance in the future).

The NL interface manager 211 can also provide a query builder interface 674 presenting a template query that was generated by one or more ML models 212. The template query is presented in a parameterized form including fillable text sections 681 corresponding to parameters 682, 684, 686, and 688 generated based on a natural language query provided by a user. Each parameter can further include other control tools such as, for example, drop down menu items 683 and/or a selectable/activatable button 685 that invokes execution of a finalized query generated using the query builder 674. The NL interface manager 211 can be configured to provide the NL interface 650 with a data presentation portion 676 configured to present results or communications in response to the execution of the finalized query generated by the query builder 674.

For example, in the example shown in FIG. 6, the natural language phrase provided is "show http network connections from windows 10 machines, ordered by bandwidth". This phrase is provided to one or more ML models 212 to parse and parameterize into parameters 682, 684, 686, 688. The parameters can include one or more subject parameters, one or more object parameters, one or more action parameters, one or more descriptor parameters, one or more execution initiation parameters, one or more Boolean parameters, and/or the like. In the example in FIG. 6, the template query generated is "HTTP+Windows 10+Order by bandwidth+Search" which can be corrected by a user by either typing into the editable text sections 681 or by selecting an option from a list of options provided in drop down menu lists activated by control items 683. The parameters in the template query in the example in FIG. 6 include object or descriptor parameters 682 ("HTTP") and 684 ("Windows 10"), action/descriptor parameters 686 ("Order by bandwidth"), Boolean parameter 689 ("+"), and execution initiation parameter 688 ("Search"). The selection of the selectable button 685 associated with the execution initiation parameter 688 invokes the performance of the search based on the parameters 682, 684, and 686 to produce the list 676 shown in FIG. 6. Example action parameters can include blocking a communication or a host, allowing a communication, filtering a set of data, sorting a set of data, displaying a set of data, applying a patch, rebooting an endpoint, executing a rule and/or the like.

Returning to FIG. 2, the ML models 212 can be any suitable ML model or models built and/or trained to receive natural language data and implement auto-completion of an incomplete natural language query, auto-correction of a word or phrase used in a natural language query, inference of intent based on a natural language query, and/or generation of supplemental training data using a reference natural language phrase to augment training data that can then be used to retrain ML models to improve performance. In some implementations, the ML model 212 can be a single ML model trained on corpuses of text, and/or primed on text associated with an identified context. The single ML model 212 can be configured to auto-complete and/or auto-correct natural language phrases, infer a user's intent associated with the identified context, and to generate a set of natural language phrases based on a reference phrase.

The ML model 212 can be configured to perform each of the above listed functions based on a signal or a prompt associated with receiving input to perform each of the functions. The signal or prompt can be different for each function from the list of auto-correction, auto-completion, intent inference, and generation of NL phrases based on a reference phrase. For example, the ML model 212 can be configured such that when the ML model 212 receives a first signal in the form of a natural language phrase input via a text space in an NL interface (e.g., space 572 in NL interface 550 in FIG. 5, or space 672 in NL interface 650 in FIG. 6) that is configured to receive user input (e.g., a signal that indicates active typing by a user in the text space), the ML model 212 can be configured to respond to the first signal by evaluating if the NL phrase is incorrect and/or incomplete and based on the evaluation perform auto-correction and/or auto-completion. The ML model 212 can be configured to receive a second signal or prompt when a user finishes providing the NL phrase (e.g., a return key press or any other suitable input indicating completion of typing). The ML model 212 can then receive the complete query and infer the user's intent and provide a template query. The user can then provide changes to the template query to generate a finalized query and can then initiate performance of the task based on the finalized query, for example, by activating an execution parameter, for example, by clicking a first button (e.g., button 685 associated with the execution parameter 688 in NL interface 650 shown in FIG. 6). The ML model 212 can be configured to receive a third signal or prompt when a user provides a reference phrase in a text space (not shown in FIG. 6) and activates a second button (not shown in FIG. 6), the second button different than the first button. The ML model 212 can be configured to respond to the third signal and initiate generation of natural language phrases based on the reference.

The ML model 212 can provide a different and/or suitable output based on the format and/or context of the input. For example, the ML model 212 can determine whether to provide auto-completion, auto-correction, intent inference, or generation of NL phrases based on a reference phrase, based on the format and/or context of the input.

In some implementations, the NL analysis device 201 can be configured to include multiple ML models 212. Each ML model can be trained on corpuses of text, and/or primed on text associated with an identified context, to perform on or more of auto-completion, auto-correction, intent inference, or generation of NL phrases based on a reference phrase. Each ML model from the multiple ML models can be configured to receive a signal or a prompt associated with receiving input to perform each of the functions, and based on the signal or prompt, perform each of the above listed functions. The signal or prompt can be different for each function from the list of auto-completion, auto-correction, intent inference, and generation of NL phrases based on a reference phrase.

In implementations in which the NL analysis device 201 includes multiple models, the ML models 212 can include a first ML model configured to receive a first signal in the form of a natural language phrase input via a text space in an NL interface (e.g., space 572 in NL interface 550 in FIG. 5, or space 672 in NL interface 650 in FIG. 6) that is configured to receive user input (e.g., a signal that indicates active typing by a user in the text space). The first ML model can be configured to respond to the first signal by evaluating if the NL phrase incorrect. If found incorrect, the first ML model can be configured to perform auto-correction. A second ML model can be configured to receive a second signal in the form of a natural language phrase input via the text space in the NL interface and respond to the second signal by evaluating if the NL phrase is incomplete and, based on the evaluation, perform auto-completion. The ML models 212 can include a third ML model configured to receive a third signal or prompt when a user finishes typing (e.g., a return key press or any other suitable input), and in response to the third signal infer a user's intent by generating a template query. The user then provides changes to the template query to generate a finalized query and then initiates performance of the task based on the finalized query, for example, by activating an execution parameter (e.g., by clicking a first button, for example, button 685 associated with the execution parameter 688 in NL interface 650 shown in FIG. 6). The ML models 212 can include a fourth ML model that is configured to receive a fourth signal or prompt when a user provides a reference phrase in a text space (not shown in FIG. 6) and activates a second button (not shown in FIG. 6) different than the first button. The fourth ML model 212 can be configured to respond to the fourth signal by initiating generation of natural language phrases based on the reference.

Each ML model included in the ML models 212 can be any suitable model including supervised, semi-supervised, unsupervised, self-supervised, multi-instance, and/or reinforcement models. Each of the ML models 212 can be a language model trained to receive natural language data and interpret the natural language data based on user needs and context. The ML models 212 can be implemented using any suitable method, process, or framework. For example, the ML models 212 can use autoencoders, artificial neural networks, convolutional neural networks, recurrent neural networks, and/or multi-layer perceptrons. The ML models 212 can include any artificial intelligence system that can be accessed to perform computations including open-source frameworks (e.g., Generative Pre-trained Transformer 3 provided under the OpenAI framework, GPT-2 also under the framework of OpenAI, Wu Dao developed by the Beijing Academy of Artificial Intelligence, OpenAI Davinci Codex, OpenAI Cushman codex, GPT-NEO2.7B and fine-tuned GPT-NEO2.7B, etc.).

In some implementations, the ML models 212 can include a first ML model configured to receive natural language data in the form of a natural language query and evaluate if the first ML model can auto-complete based on training data indicating frequently used natural language phrases. The first ML model 212 can be trained to identify an incomplete natural language phrase and based on the incomplete natural language phrase, predict the next characters and/or words as the user types the natural language phrase. The first ML model can be configured to provide a list of options that can be potentially used to complete the natural language query with each options in the list of options having an identified likelihood of being the correct choice. The output of the ML model can be provided as a rank ordered list based on the likelihood.

The ML models 212 can include a second ML model configured to receive a natural language phrase and evaluate the words in the natural language phrase in an identified context (e.g., cybersecurity, data management, information storage and retrieval, instrumentation control, communications management, etc.). The second ML model can be configured to auto-correct one or more words that may be identified as a typographical error, misspelling, or wrong word choice given the context of use to manipulate a management system.

The ML models 212 can include a third ML model that is configured to receive a natural language phrase (that can be after the auto-completion and/or auto-correction) and parse the natural language phrase to generate a template query including individual parts that can be words, symbols, operators, etc. The template query can include one or more parameters. Each individual part of the template query can be associated with a parameter, and the parameters can form a syntax and/or an equation. Each parameter can be associated with a set of options that can be used in place of that individual part that is associated with the parameter. The options can be in the form of a list. A user can choose an option from a list associated with a parameter in a template query to correct that part of the template via the NL interface in which the template query is presented. The finalized template query can then be used to generate a system command that can be used to perform a task via a management system.

The ML models 212 can include a fourth ML model configured to receive a natural language phrase as a reference and generate a set of similar natural language phrases (e.g., semantically similar, functionally similar, etc.). The fourth ML model can be configured to receive the reference NL phrase and generate synonyms of the words in the reference NL phrase, and then use a combinatorial approach in using the synonyms to generate semantically, syntactically, functionally and/or contextually similar phrases as output. The output can be used as supplemental training data that can be used to augment training data for retraining the first, second, and/or third ML models described above. The reference NL phrase can be a finalized query that is corrected and approved by a user (e.g., after auto-completion, auto-correction, intent inference). The reference NL phrase can be obtained from one or more human users, for example, trained operators proficient in the context of the management system or trained in the operation of the management system without the NL interface. In some implementations, a single ML model can be configured to accomplish two or more of the functions from auto-completion, auto-correction, and intent inference. The ML models 212 can be any suitable models. In some implementations, the one or more ML models can be Generative Pre-trained Transformer 3 (GPT-3) models, GPT-2 models, Wu Dao models, OpenAI Davinci Codex, OpenAI Cushman codex, GPT-NEO2.7B and finetuned GPT-NEO2.7B, etc.

The data manager 213 is configured to receive the natural language data and/or training data and organize the data for processing and/or training the ML models. The data manager 213 can be configured to receive natural language phrases and provide the information to the ML models 212. For example, in some implementations, the data manager 213 can perform one or more preprocessing steps (e.g., extraction of information, generation of feature vectors, etc.) to be provided to the one or more ML models 212. The data manager 213 can be configured to receive user made selections (e.g., selections made via the NL interface when the user is provided with options for auto-completion or auto-correction) and/or user made corrections (e.g., corrections or changes made by a user to a template query after inference of intent and generation of the template query). The data manager 213 can store the user made selections and corrections and generate supplemental training data that can be used to augment the training data used to train the ML models 212. The data manager 213 can be configured to receive reference NL phrases and provide the reference NL phrase to an ML model to generate similar phrases that can be used to augment training data further.

The data manager 213 can be configured to receive outputs obtained after performance of tasks via the management system and organize the outputs and other analyses or reports generated based on the outputs. The data manager 213 can be configured to receive information from the action manager 214, for example, information associated with actions or recommendations provided that may be directed to compute devices and/or servers (or other devices), under the management of the management system. The actions or recommendations can be based on the results obtained in response to the performance of the desired task via the management system.

The data manager 213 can be configured to receive the output of the ML models 212 (e.g., outputs associated with auto-completion, auto-correction, and/or intent inference) and compare the outputs against user made corrections or selections. The data manager 213 can be configured to assess the amount, degree and/or frequency of user selections or corrections and, based on the assessment, evaluate one or more ML models and their current performance. The data manager 213 can be configured to keep a record of performance of ML models 212 and can be used to compare a current performance of an ML model against a past performance or a predetermined standard (e.g., user provided threshold of desired performance). The data manager 213 can be configured to use the evaluation to decide if one or more ML models 212 need retaining and if a particular type or kind of supplemental training data can be used to obtain targeted improvements in performance of the one or more ML models. The data manager 213 can calculate metrics of performance of the one or more ML models and store a record of the performance over a desired period of time. The data manager 213 can store a record of data received from the compute devices coupled to the management system (e.g., their state of activity, their state of security, their degree of exposure to threats, the level of permission or privileges provided to users of the compute devices, etc.). The data manager 213 can store a record of alerts or warnings generated by the management system, actions or recommendations generated by the management system, and/or other analytical reports associated with the operation of the management system.

The action manager 214 can be configured to receive results from the performance of the task desired by the user when providing the natural language phrase or request and based on the results, generate and/or implement an action to be performed. As an example, the management system can be a cybersecurity system that manages a set of endpoints that may be in communication with a set of hosts. Example tasks performed via the cybersecurity management system can include listing, or displaying a list of endpoints that fit a set of criteria defined by the natural language phrase that is used to infer a template query and a finalized query. Once the finalized query is executed, the results obtained can inform a set of actions. Example actions to be executed based on the results can include blocking a communication to one or more endpoints, blocking one or more internet protocol (IP) addresses associated with a subset of hosts from communicating with endpoints, applying a patch to a subset of hosts, rebooting a subset of endpoints that match a predefined criterion or criteria, running a specified rule (e.g., a Yara rule) on a subset of managed endpoints, etc.

Figure 3:
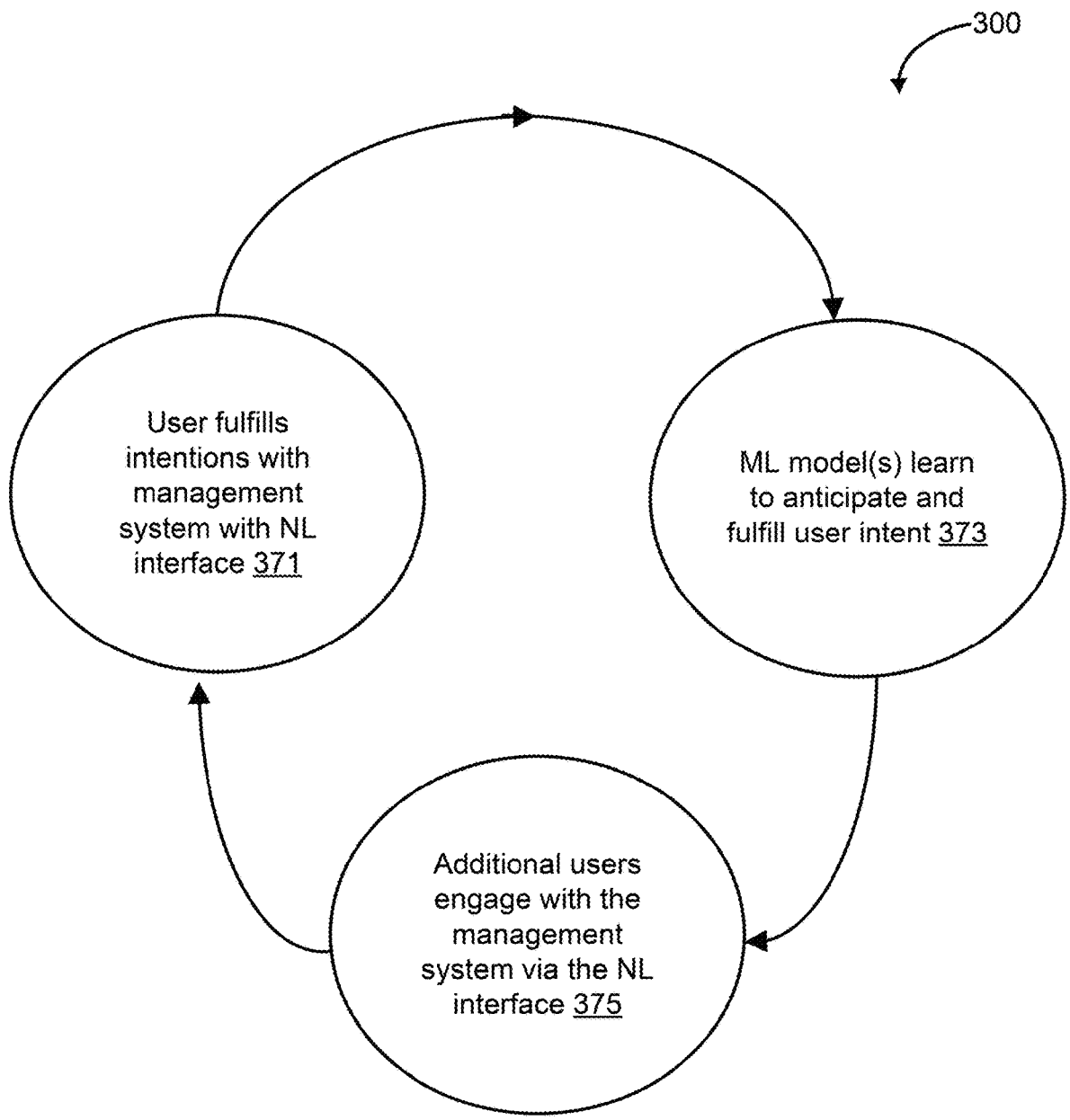
FIG. 3 is a schematic representation of interactions between users and a management system via an NL interface implemented by an NL analysis device, according to an embodiment.

The NL analysis device 201 is generally configured to operate in the NL analysis system as shown in the workflow 300 in FIG. 3. A user starts with intentions of performing a set of tasks via a management system. At 371 of the workflow 300, the user fulfills their intentions with the management system by operating the management system via the NL interface implemented by the NL analysis device, as described herein. The user provides an initial natural language phrase, request, or query. The NL analysis device can provide an initial set of options for auto-completion and/or auto-correction. The user makes selections of options that align with their original intent, generating a complete natural language query. The NL analysis device then parses the complete natural language query and returns a template query. The user makes suitable corrections to the template query to generate a finalized query. The NL analysis device receives the finalized query and generates a system command based on the finalized query such that the tasks may be performed to return results. The user can view the results and adjust the natural language phrase, option selections, and/or the corrections to the template query to generate an updated finalized query, any number of times, that can be run to obtain better results.

At 373 the NL analysis device (e.g., the ML models implemented by the NL analysis device) learn to anticipate user intentions (e.g., learn to auto-complete and auto-correct natural language phrases input by the user and use the natural language phrases to infer the user's intent). The ML models can be retrained using supplemental training data generated based on the user selections of options, user correction to template queries, etc., such that the ML models can progressively arrive at as close a prediction as possible to the intent of the user.

At 375, the workflow 300 includes additional users engaging with the management system via the NL interface, providing more diverse feedback in the form of user made selections of options to auto-complete or auto-correct and/or user made corrections to template queries. As shown in FIG. 3 increased user engagement in turn feeds through 371 where users interact with the management system via the NL interface, and at 373 the NL analysis device and the ML models can be retrained to learn increasing larger number of associations between natural language phrases and finalized queries that can execute system commands via the management system. The cyclical workflow 300 is such that each step improves the other resulting in an improved, intuitive, user interface where users can use simple natural language to interact and manipulate complex management systems instead of having to go through rigorous time-consuming training of complicated technical jargon or learning to navigate intricate menu trees with functions listed only to find the correct function to perform each task intended.

Figure 4:
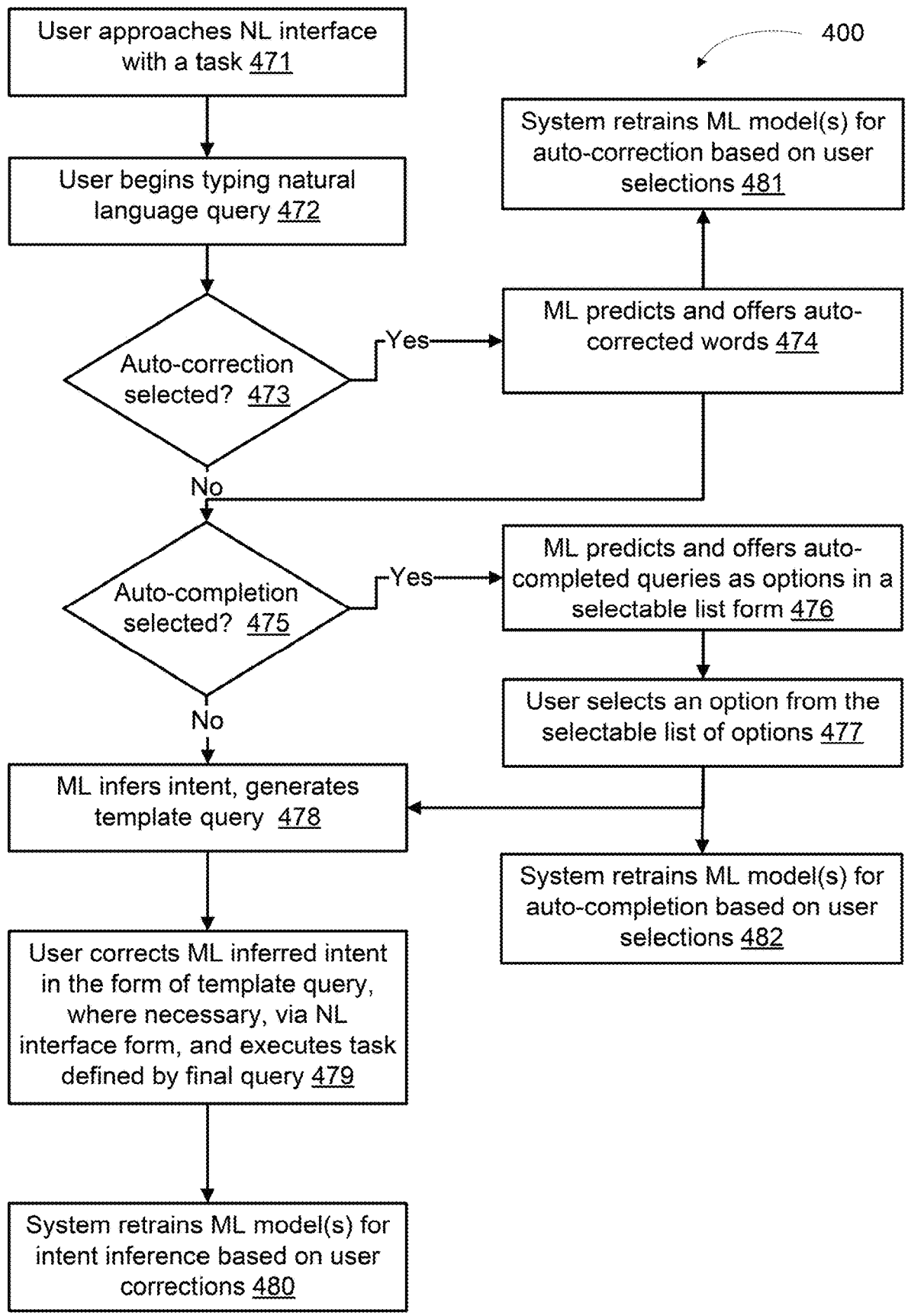
FIG. 4 is a flowchart showing a method of implementing an NL interface using an NL analysis device, according to an embodiment.

FIG. 4 is a flowchart of a method 400 of implementing and using an NL interface using an NL analysis device, as described herein, according to an embodiment. In use, the NL analysis device 201 can be used according to the method 400 shown in FIG. 4. At 471, a user approaches the NL interface (e.g., NL interface 550, 650, 950, 1050) implemented by the processor 210, included in the NL analysis device 100. At 472, the user begins typing a natural language query into a text space (e.g., space 572 in NL interface 550 or space 672 in NL interface 650).

The processor 210 evaluates, at 473, if the auto-correction functionality is selected or activated in the NL interface. If the auto-correction functionality is selected, at 474, the processor 210 implements an ML model (e.g., a first ML Model described above) to predict and offers, based on the typed portion of the natural language query, auto-corrected words. The ML model can provide a list of options in a selectable list form that can be presented via the interface. Alternatively, the user can reject all options or auto-corrections if they do not fit, and continue typing to complete the natural language query. Any selections or acceptance of corrections made by the user or any indication by the user that they rejected all corrections or options provided is stored and the information associated with the corrections or options provided and the completed natural language query is used to generate a supplemental training data used to augment the training data. That augmented training data is then used at 481, to invoke the retraining of the ML model used for auto-correction for improved performance at auto-correction based on the acceptance or rejection of the corrections or options provided. The processor than moves to 475 for evaluation of auto-completion functionality. Both the evaluation of auto-completion functionality at 475 and the system retraining for auto-correction at 481 can occur, and these paths are not mutually exclusive.

The processor 210 evaluates, at 475, if the auto-completion functionality is selected or activated in the NL interface. If the auto-completion functionality is selected, at 476, the processor 210 implements an ML model (e.g., second ML model described above) to predict, based on the typed portion of the natural language query, auto-completed queries as options. The ML model can provide a list of options in a selectable list form that can be presented via the interface.

At 477, the user selects an option from the list of options, which is then used to complete the natural language query and indicate the completion by an action e.g., a button press, click etc. Alternatively, the user can reject all options, if they do not fit, and continue typing to complete the natural language query. The complete natural language query is then provided to an ML model (e.g., third ML model described above) for intent inference.

Any selections made by the user or any indication by the user that they rejected all options provided is stored and the information associated with the options provided and the completed natural language query is used to generate a supplemental training data used to augment the training data. That augmented training data is then used at 482, to invoke the retraining of the ML model used for auto-completion for improved performance at auto-completion based on the user selections or rejection of options provided.

If at 475, the processor 210 determines that auto-completion is not selected, the processor awaits the completion of the natural language query by the user. The completion of the natural language query by the user can be indicated by a button press, a keystroke, and/or any other suitable input.

At 478, the processor uses the ML model (e.g., third ML model) to infer the user's intent and generate a template query. The processor 210 presents the template query in editable form to the user via the NL interface. Both the inferring user's intent at 478 and the system retraining for auto-completion at 482 can occur, and these paths are not mutually exclusive.

At 479, the user corrects the template query as appropriate and where necessary, via the editable space in the NL interface. The processor 210 then receives any user corrections, incorporates the corrections, and generates the finalized query. The processor 210 executes the task by invoking a system command based on the finalized query. Any corrections made to the template query or indications that no corrections were made can be stored and used to generate supplemental training data that can augment the training data.

The augmented training data can be used to retrain the ML model used for intent inference at 478 (e.g., the third ML model described above). At 480, the processor 210 retrains the ML model used for intent inference at 478 (e.g., the third ML model described above) using the augmented training data including the user corrections to improve the performance of the ML model at inferring user's intent and generating the template query based on the complete natural language query.

As described above, FIGS. 5 and 6 show example NL interfaces 550 and 650, respectively. The NL interfaces 550 and 650 are configured to receive a natural language request from a user, implement auto-completion and/or auto-correction as desired, implement inference of intent and generate a template query based on the natural language request or phrase. The NL interfaces 550 and 650 are further configured to receive user corrections to the template query and generate a finalized query approved by the user, which is then used to execute a system command based on the finalized query, to perform a task intended by the user via the management system. The NL interfaces 550 and 650 are configured to receive user selections of options when implementing auto-completion and/or auto-correction, and receive user corrections to a template query when implementing intent inference. The NL interfaces 550 and 650 are configured to generate supplemental training data based on the user selections/user corrections. The NL interfaces 550 and 650 can provide the supplemental training data to augment training data. The supplemental training data can be used to retrain the ML models to improve their performance at auto-completion, auto-correction and/or intent inference based on natural language phrases.

Figure 7:
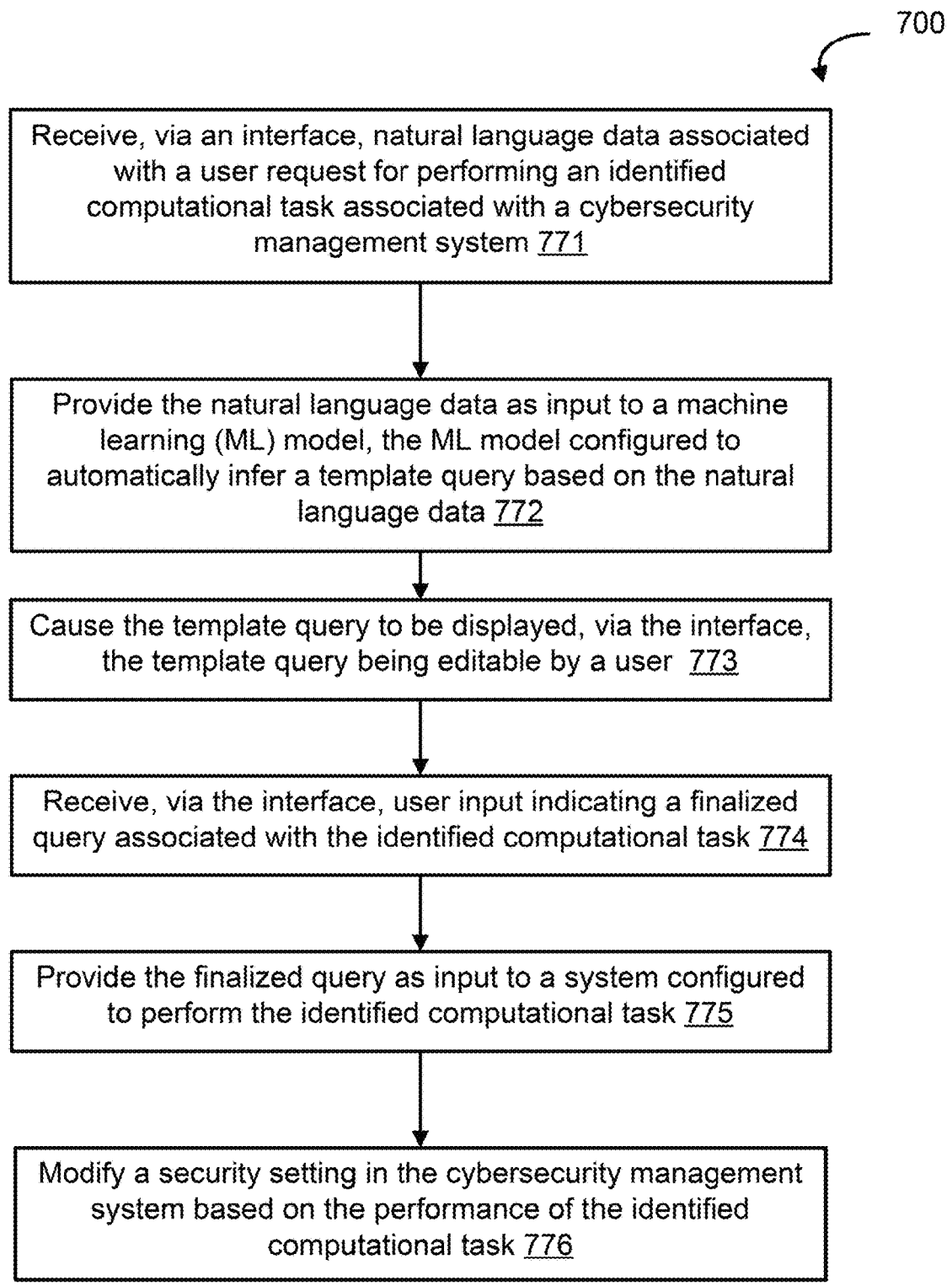
FIG. 7 is a flowchart showing a method of implementing an NL interface using a NL analysis device, according to an embodiment.

FIG. 7 shows a flowchart illustrating a method 700 of implementing intent inference using an NL analysis system, according to an embodiment. The method 700 can be implemented by an NL analysis device (e.g., NL analysis device 101, 201) of an NL analysis system (e.g., system 100) described herein. The method 700 includes, at 771, receiving, via an interface (e.g., an NL interface), natural language data associated with a user request for performing an identified computational task associated with a cybersecurity management system. The natural language data can be a natural phrase typed in by a user at a text space of an NL interface, as described herein. For example, the natural language data can be a natural language request or query generated using English phrases and typed into a text space (e.g., 572, 672) of NL interfaces 550, 650. The natural language data can be a phrase indicating an intent to perform an identified task via the cybersecurity system.

In some implementations, the method 700 can include steps to implement auto-completion and/or auto-correction of a partially typed or incorrectly typed natural language request (not shown in method 700), to generate the complete natural language request, as described herein. For example, the user can type an incomplete portion of the natural language request and the method can include receiving the incomplete portion, and automatically predicting, using an ML model, based on the incomplete portion of the natural language request, a set of potential options for a remaining portion of the incomplete natural language request. Each option from the set of potential options can provide a different remaining portion and the user can select one option from a list. In some implementations, the ML model used for auto-completion can be either the same ML model as that used for auto-correction, intent inference, and/or generation of natural language phrases based on reference phrase to augment training data. In some implementations, the ML model used for auto-correction can be different than the ML model used for auto-completion, different than the ML model used for intent inference, and different than the ML model used for generating natural language phrases to augment training data.

Similarly, for auto-correction, the user can type an incorrectly spelled word or phrase in a portion of the natural language request and the method can include receiving the incorrectly spelled portion, and automatically predicting, using an ML model, based on the incorrectly spelled portion of the natural language request, a set of potential options providing a corrected portion of the natural language request. Each option from the set of potential options can provide a different corrected remaining portion and the user can select an option from a list. Alternatively, the correction can be automatically applied by default and the user can undo the correction if the correction does not match the user's intent. In some implementations, the ML model used for auto-correction can be either the same ML model as that used for auto-completion and/or intent inference. In some implementations, ML model used for auto-correction can be different than the ML model used for auto-completion, different than the ML model used for intent inference and different than the ML model used to generate natural language phrases to augment training data.

At 772, the method 700 includes providing the natural language data as input to a machine learning (ML) model, the ML model configured to automatically infer a template query based on the natural language data. In some implementations, the natural language data can be used to extract one or more feature vectors which can be provided as input to an ML model. The NL analysis device can be configured to receive the natural language data and parse the natural language data into a set of portions. The ML model can use the portions to predict a template query including a set of portions. Each portion of the template query from the set of portions can be associated with a parameter from a set of parameters. Parameters can include subject or object parameters, descriptor parameters, action parameters, execution parameters, etc. (e.g., parameters 682, 684, 686, and 688 described in reference to the NL interface 650 in FIG. 6).

At 773, the method 700 includes causing the template query to be displayed, via the interface. The display can be such that the template query is editable by a user. For example, the template query can be displayed as a set of portions, each portion associated with a parameter (e.g., parameters 682, 684, 686, and 688 described in reference to the NL interface 650 in FIG. 6). The set of portions or the set of parameters can be determined based on a syntax and/or context associated with the natural language data.

In some implementations, the method 700 can include receiving, via the interface, changes or edits to the template query made by the user. In some instances, the method 700 can include causing the display of template query as a set of parameters such that each portion from the set of portions is displayed as one option from a set of options associated with a parameter from the set of parameters. For example, as shown in FIG. 6, the portion "HTTP" is associated with the parameter 682 and provides one option for this parameter 682. The portion "Windows 10" is associated with the parameter 684 and provides one option for this parameter 684, and so on. The method 700 can include providing control tools (e.g., editable text space 681, activatable dropdown menu 683 etc.), via the interface. The control tools (activatable dropdown menu 683) can be configured to receive, from the user, a selection of at least one option from the set of options associated with each parameter from the set of parameters. In some implementations, the control tools (e.g., editable text space 681) can be configured to receive, from the user, a correction to the portion of the template query.

The corrections and/or selections made by the user can generate the finalized query. The corrections or selections made by the user can be stored and used to generate supplemental training data to augment the training data. The augmented training data can be used to retrain the one or more ML model(s) implemented by the NL analysis device to improve the performance of the ML model(s) at auto-completion, auto-correction, intent inference, and/or generation of natural language phrases to further augment training data. At 774, the method 700 includes receiving, via the interface, user input indicating a finalized query associated with the identified computational task.

At 775, the method 700 includes providing the finalized query as input to a system configured to perform the identified computational task. The finalized query can be used to generate a system command that is compatible with the cybersecurity management system. For example, as shown in FIG. 5, the finalized query "HTTP+Windows 10+Ordered by bandwidth+search" can be converted to a complex SQL query or invoke identified functions to execute specific routines or protocols in the cybersecurity management system to obtain a list of HHTP connections with sources as a compute device running Windows 10 as the operating system, and sort the list by the bandwidth associated with the connection.

At 776, the method 700 includes modifying a security setting in the cybersecurity management system based on the performance of the identified computational task. As an example, based on the list, in FIG. 5, of HTTP based connections from compute devices running Windows 10, sorted by bandwidth, the NL analysis system can identify one or more connections (e.g., connection associated with a bandwidth greater than a predetermined value, for illustrative purposes) and modify a security setting in the cybersecurity management to permit or block one or more connections (e.g., block the connections identified to be associated with greater bandwidth). As another example, based on the list in FIG. 5 of HTTP based connections from compute devices running Windows 10, sorted by bandwidth, the NL analysis system can identify one or more connections (e.g., connection associated with a start time that indicates a duration greater than a predetermined value, or connection associated with data that has a size greater than a predetermined value (e.g., >X bytes in), for illustrative purposes) and modify a security setting in the cybersecurity management to highlight, alert, permit, quarantine, or block one or more connections (e.g., highlight, to a user, the connections identified to be associated with greater data transfer, or send an alert, to an external device, highlighting the connections identified to be running for a duration greater than a threshold value).

Figure 8:
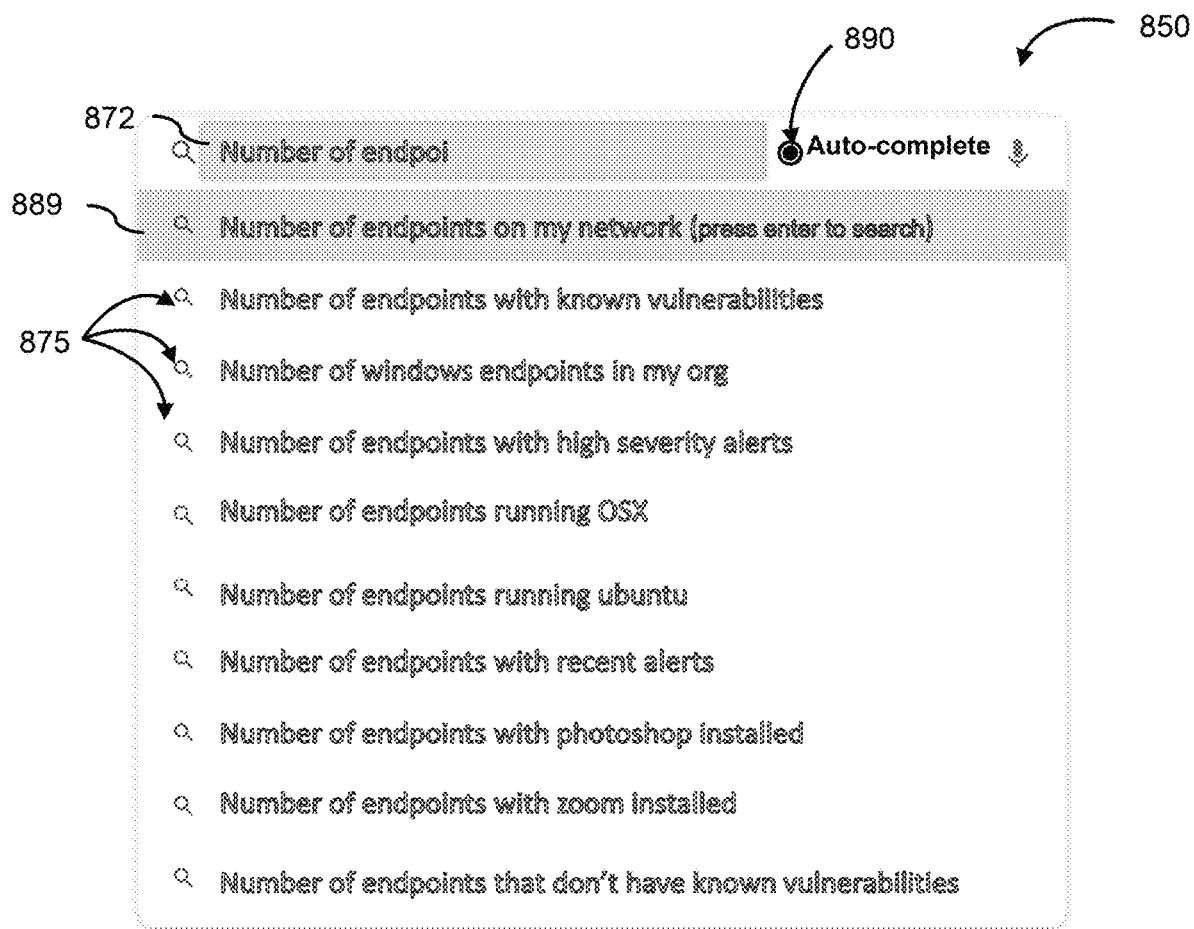
FIG. 8 illustrates an NL interface showing an example of auto-completion of a natural language query implemented by an NL analysis device, according to an embodiment.

FIG. 8 is an illustration of an example implementation of auto-completion of natural language phrases, implemented by an NL analysis device, according to an embodiment. The NL interface 850 can be substantially similar, in structure and/or function, to the interfaces 550 and 650 described herein. The NL interface 850 includes the text space 872 where a user can type to provide a natural language phrase or request or query. As shown, when the user starts typing, if auto-complete is activated via the control tool 890, the NL analysis device provides the list of options 889 that can be used to complete the natural language request. The list 889 includes options 875. The user can select an option from options 875 from the list 889 and the selection can be used to generate an auto-completed natural language request. The user's selection can be used to generate supplemental training data that can augment the training data used to train the ML model associated with the NL analysis device, and used for auto-completion as described herein.

Figure 9:
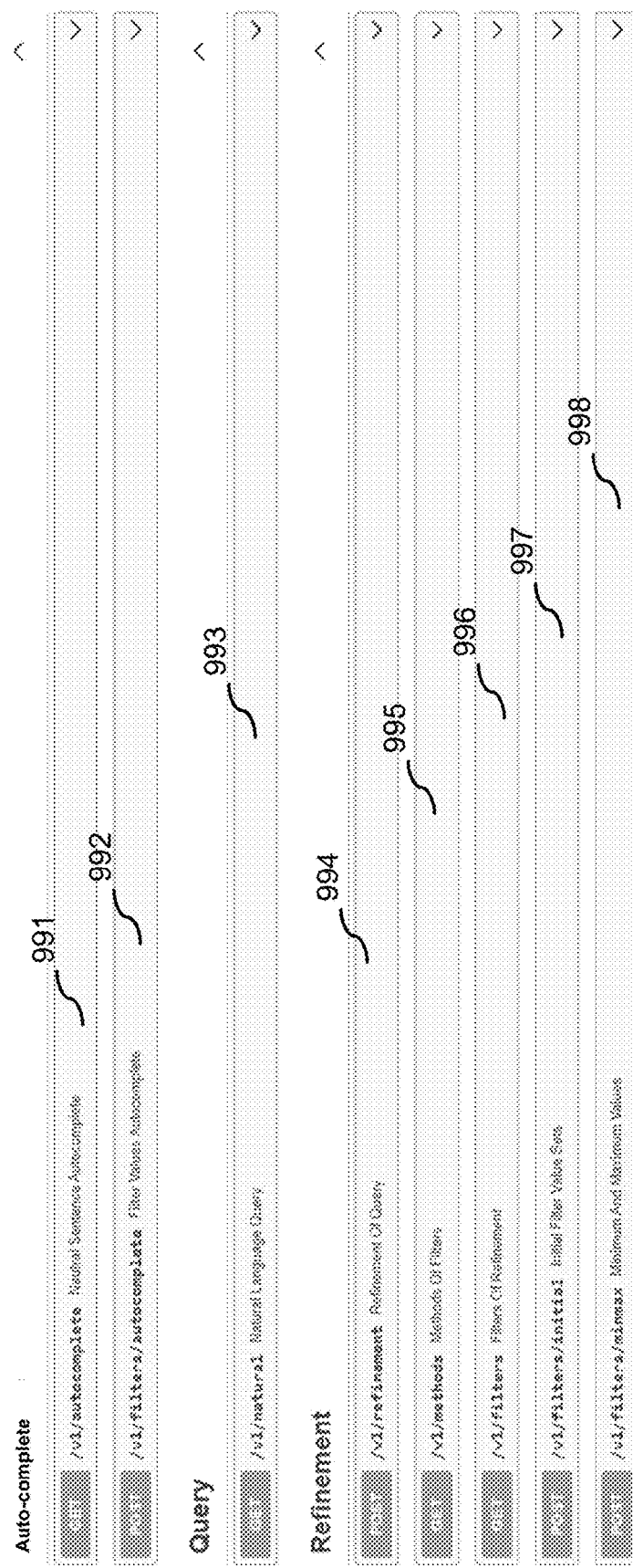
FIG. 9 shows set of function calls in an example application programming interface (API) associated with an NL interface implemented by an NL analysis device, according to an embodiment.

In some implementations, the methods, processes, or functions carried out by the NL analysis device and its components described herein can be implemented via an application programming interface (API) that is configured to support execution of the methods, processes, or functions, for example, on a backend server. FIG. 9 is an illustration of a set of function calls behind the implementation of a NL analysis device using an example API that can support auto-completion, auto-correction or other refinement to queries, processing of natural language requests or queries, inferring intent, and/or generating natural language phrases similar to a reference natural language phrase to augment training data.

In some implementations, the functions of the NL analysis device can be implemented via an API that is configured to execute a set of functions to receive user input, auto-complete to generate an NL query, receive the competed NL query and infer intent through a sequence of functions referred to as refinement, to generate the template query and/or the finalized query. The example shown in FIG. 9 includes function calls under "Auto-complete" to get natural language phrase as input (991) and implement the auto-complete functionality and post the auto-completed output (992). The example includes a function call under "Query" that includes the function to get input (993) from the user. The example includes function calls under "Refinement" that includes functions to post the template query (994), get any input related to methods of filters selected by the user (995) (e.g., input related to parameters of interest to the user), and get any input related to filters of refinement (996) (e.g., input related to options selected by user for each parameter). Functions under Refinement can include posting initial filter value sets (997) (e.g., options selected under each parameter) and posting ranges for the filter values, the ranges defined by minimum and maximum values (998) (e.g., a start time parameter with filter values ranging from 1 month to 2 months).

Figure 10:
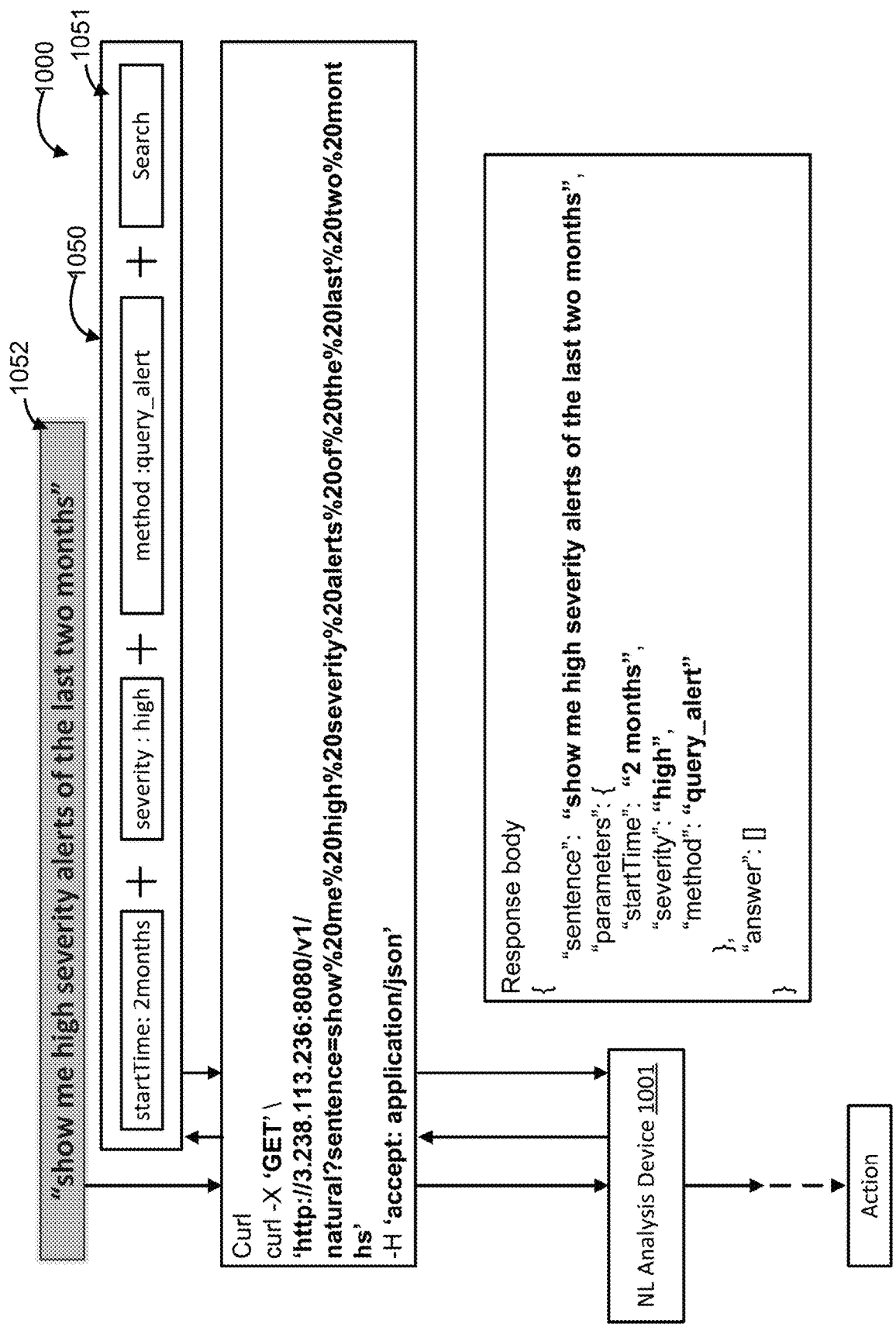
FIG. 10 shows an example representation of workflow implementing an NL interface using an NL analysis device, according to an embodiment.

FIG. 10 shows an example workflow 1000 of an NL analysis system, using an NL interface 1050 via an NL analysis device 1001 implemented by an API, according to an embodiment. The NL analysis device 1001 can be implemented by one or more compute devices or servers or computational resources provided in the cloud computing framework. The interface 1050 can be implemented via any user interface application, implemented on any compute device, for example, a mobile device, a browser application, a plugin in a web browser, a website, etc. The workflow 1000 includes an example natural language query and a portion of the process behind converting the natural language query into a parameterized template query that can be used to execute the task. The natural language (NL) query example used in FIG. 10 is "show me high severity alerts of the last two months" For illustrative purposes, the NL query is shown in a visual manner in the text space 1052. The user can input the NL query and receive a response or answer in a JavaScript Object Notation (Json) format, as shown in the example in FIG. 10. The response or answer can show that the NL query "show me high severity alerts of the last two months" is parameterized into parameters "startTime", "Severity", and "method". Each parameter is associated with a portion of the NL query. For example, "startTime" is associated with "2 months", "severity" is associated with "high", and "method" is associated with "query_alert", the function call intended. For illustrative purposes, the parameterized template query is shown in a visual manner in the text space 1051.

FIG. 11 is a flowchart illustrating a method 1100 to generate natural language data to augment a training data set, using an NL analysis device (e.g., device 101, 201), according to an embodiment. As described, user input associated with auto-completion, auto-correction, and/or inference of user intent can be used to augment training data such that the augmented training data can be used to improve performance of the one or more ML models described herein. An additional method to augment training data is by providing a reference natural language phrase or request, as a first sample, to an NL analysis device, and using the NL analysis device to generate additional samples that may be similar to the reference natural language phrase in predetermined ways or attributes. Such methods can generate quality training data (with or without curation) in a particular context of use of the ML models so that the ML models can be primed or retrained via context-based learning.

The method 1100 includes, at 1171, receiving, via an interface, a natural language request for performing an identified task in a management system. The management system is associated with a set of system commands. The set of system commands is configured to perform one or more computational tasks associated with the management system. The identified task is from the one or more computational tasks and the management system is operating within an identified context. For example, the context can be cybersecurity and the management system can be a cybersecurity management system. The set of system commands can be associated with function calls or processes that call for specified actions like finding information related to the security of the managed resources, sorting the information, filtering the information, identifying one or more sources (compute devices, servers, hosts, connections, etc.) that fit one or more criteria, etc. In some implementations, the system commands can include actions to external entities such as, for example, identifying a potentially malicious connection and blocking the connection or communication or the host, identifying a compromised compute device, quarantining the compute device of a portion of the compute device, etc.

At 1172, the method 1100 includes extracting, based on the identified context, a set of features from the natural language request. At 1173, the method includes providing the set of features to a first machine learning (ML) model to infer a template command based on the natural language request. The first ML model is trained using first training data including a set of natural language phrases associated with the context. The first ML model is trained to receive features based on the set of natural language phrases as input. The first ML model can be comparable to the third ML defined with reference to ML models 212 implemented by processor 210 of NL analysis device 201 in FIG. 2, and configured to receive a complete NL query from a user and infer the user's intent to generate a template query. The first ML model is trained to generate a template command which can be substantially similar in structure and/or function to a template query described herein. The template command can be associated with a set of system commands. As an example, the first training data can include corpuses of text in natural languages (e.g., English, French, Spanish, etc.). The first ML model can be trained to infer intent of the user based on the natural language request. The template command can be substantially similar to the template query described herein. The first ML model can be a Generative Pre-trained Transformer 3 (GPT-3) model, or a GPT-2 model, OpenAI Davinci Codex, OpenAI Cushman codex, GPT-NEO2.7B and finetuned GPT-NEO2.7B, or any other suitable language model trained on corpuses of language data. The first ML model can be configured to parse the natural language request, parameterize the natural language request and generate the template command based on the first training data and the context.

At 1174, the method includes receiving, as output from the first ML model, the template command associated with the natural language request. The method can include displaying, via the interface, the template command in an editable form to be edited or approved by a user. The method can further include receiving, via the interface, a final command, based on the template command, the final command approved by the user. The final command can be substantially similar in function and/or structure to a finalized query described herein. For example, as described herein, the user can provide one or more corrections to the parameters and/or portions of the template command. In some instances, the user can provide one or more selections of options. Each option can be associated with a parameter.

At 1175, the method includes providing the final command as a reference input to a second ML model. The second ML model can be configured to generate a set of natural language phrases semantically related to the reference input. The second ML model can be a GPT-3 model, GPT-2 model, OpenAI Davinci Codex, OpenAI Cushman codex, GPT-NEO2.7B and finetuned GPT-NEO2.7B, or any other suitable language model trained on large corpuses of language data. The second ML model can be configured to receive the template command as a reference input or reference natural language phrase (that is approved by a user) and generate a set of similar natural language phrases based on the reference natural language phrase by identifying and associated wildcard identities to a set of key words in the reference natural language phrase that can be rephrased to convey the same meaning or a similar meaning, given the context. The second ML model can then determine suitable synonyms that can be used to replace one or more key words from the set of key words. The second ML model can be configured to generate the set of natural language phrases related to the reference phrase by combinatorically permuting and/or shuffling the various synonyms of each keyword from the set of keywords with each other synonym of each other keyword from the set of keywords.

At 1176, the method 1100 includes receiving from the second ML model, the set of natural language phrases semantically related to the reference input. At 1177, the method 1100 includes generating a second training data based on the set of natural language phrases semantically related to the reference input. At 1178, the method 1100 includes augmenting the first training data by adding the second training data to the first training data to generate third training data. The augmented third training data can be used to retrain the first ML model and/or the second ML model and be configured to improve the performance of the first ML model at inferring intent of the user to generate the template command, and/or improve the performance of the second ML model at generating a set of natural language phrases based on a reference natural language phrase.

The method, at 1179, includes providing the final command to the management system to implement the identified task.

Figures 12A, 12B:
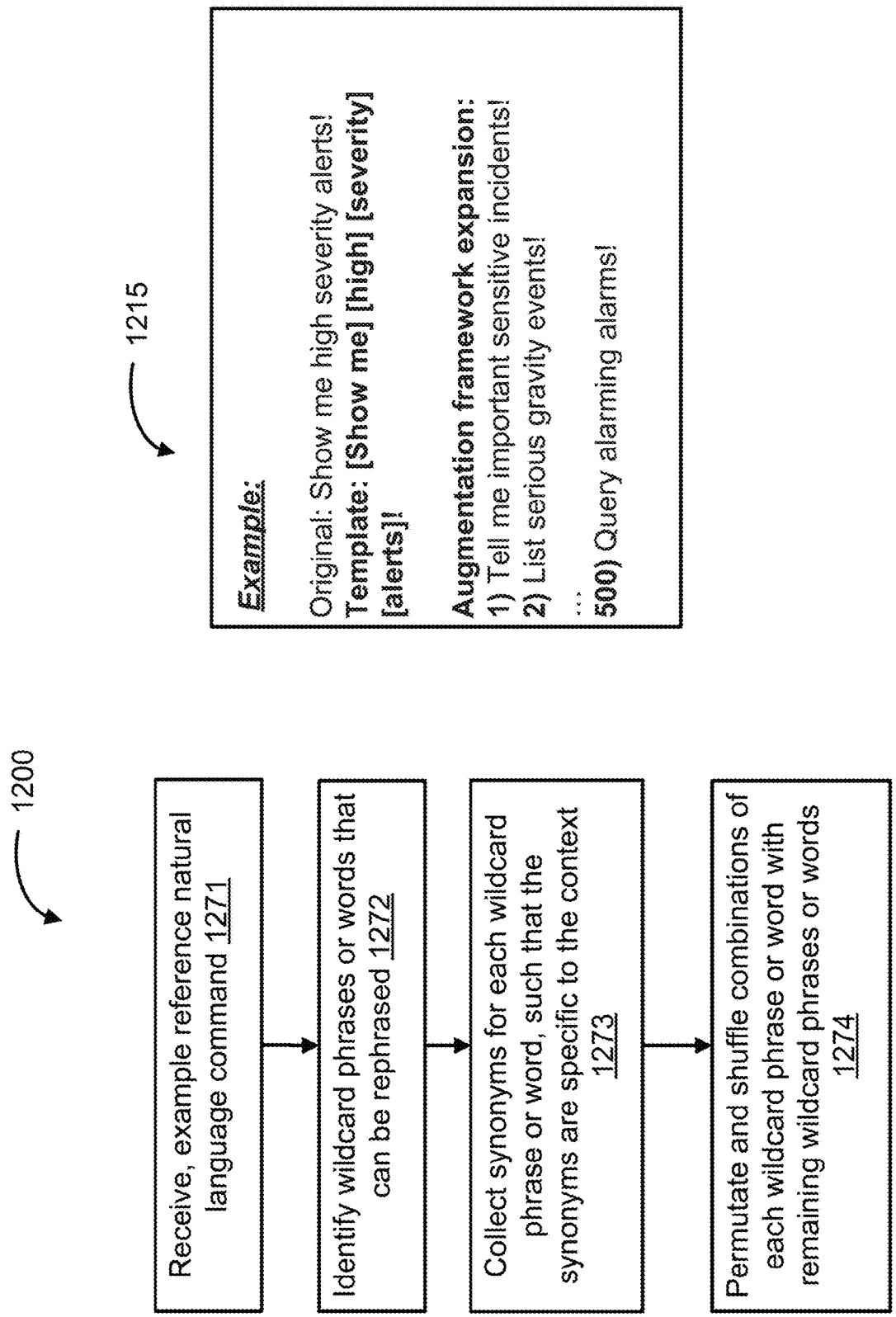
FIG. 12A is a flowchart showing a method of implementing an NL interface and using the NL interface for generating supplemental training data to train Machine Learning (ML) model(s) to infer a query or command, using an NL analysis device, according to an embodiment.
FIG. 12B is an example representation of generating supplemental training data to train Machine Learning (ML) model(s) to infer a query or command, using an NL analysis device, according to an embodiment.

FIGS. 12A and 12B show example flow chart of a method 1200 and an example implementation of the method 1200, respectively to generate natural language phrases to augment training data, using an NL analysis device, according to an embodiment.

In some implementations, the method 1200 can be substantially similar in portion or in total to the method 1100 described with reference to FIG. 11. For example, the steps in method 1200 can be a detailed illustration of the portion of method 1100 of FIG. 11 involved in step 1175 of providing the final command as a reference input to a second ML model, and step 1176 of receiving from the second ML model, the set of natural language phrases semantically related to the reference input. In some implementations, any portion of the method 1100 and any portion of the method 1200 can be executed in any suitable device or devices or via APIs, etc. In some instances, a compute device can access the NL analysis device (e.g., NL analysis device 101, 201, etc.) via any suitable method including a browser, a native application, a third-party application, etc. In some implementations, the method 1100 can be implemented in a client-side device (e.g., a compute device or a browser) and the method 1200 can be implemented in a server-side device or a computational framework in a cloud computing setup.

The method 1200 includes at 1271, receiving an example reference natural language command. The example reference natural language command can be an NL request or NL query and can be received from a user via an NL interface as described herein. As shown in the example in FIG. 12B, the NL command or NL request can be the original "Show me high severity alerts!" The NL analysis device associated with the method 1200 can parse, parameterize, and infer intent to generate the template command or template query "[Show me] [high] [severity] [alerts]!".

At 1272 the method includes identifying wildcard phrases and/or words that can be rephrased. The NL analysis device can identify the keywords or wildcard phrase that can be rephrased using any suitable method. The wildcard words or phrases in the example in FIG. 12B are shown within box brackets [ ]. In the example in FIG. 12B, therefore, the identified wildcard phrases are "Show me", "high", "severity" and "alerts".

At 1273, the method 1200 includes identifying synonyms for each wildcard phrase or word, such that the synonyms are specific to the context. As shown in the example in FIG. 12B, synonyms for "Show me" can be "Tell me", "list", etc. Synonyms for "high" "severity" can be "important" sensitive" or "serious" "gravity" and so on. As an example, the ML model can be configured to provide a predetermined number of NL phrases based on the reference NL phrase, e.g., 500.

At 1274, the method 1200 of FIG. 12A includes permutating and shuffling combinations of each wildcard phrase or word with remaining wildcard phrases of words to generate multiple training expressions from the synonyms such as, for example, "Tell me important sensitive incidents!", "List serious gravity events!" and "Query alarming alarms!".

Training data in the form of NL phrases can be augmented with newly generated data in the form of NL phrases by combinatorial expansion of synonyms of a few keywords as described previously. In some implementations, the synonyms can be deterministically encoded, for example, by high quality data provided by expert human users in the context of the management system. FIG. 13A lists a set of keywords (e.g., "alert", "severity" (categories—high, medium, and low), "host", "occurred", "related" and "the number of" identified as those wildcard words or phrases that can be rephrased. The list of words in each row following the reference word or phrase is a potential synonym for that word that can be used in place of the reference keyword to generate a semantically and/or syntactically similar NL phrase. These lists in FIG. 13A can be deterministically encoded.

FIG. 13B shows a list of NL phrases generated based on combinatorial expansion of the synonyms in the list in FIG. 13A. The list in FIG. 13B can be used a supplemental data to augment training data to retrain ML models on the augmented training data.

Figure 14:
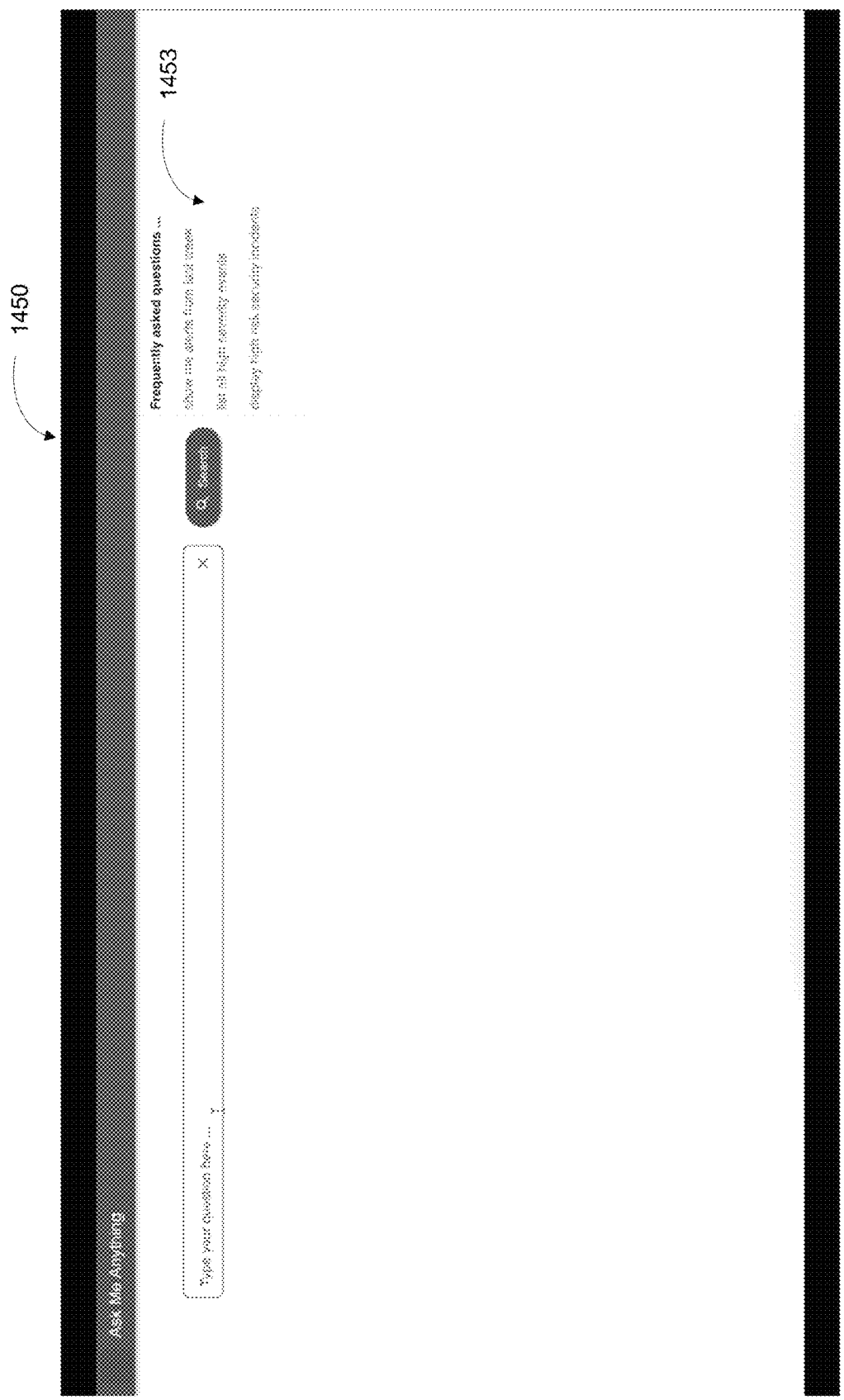
FIG. 14 shows an example NL interface implemented by an NL analysis device for manipulating a cybersecurity management system, according to an embodiment.

In some implementations, the NL interface can be configured to display statistically commonly asked NL request to aid with a new user intending to perform a task via a management system that may be a common task for that management system. FIG. 14 is an example interface 1450 that includes a panel 1453 that displays a list of "frequently asked questions" that may provide a starting point to users (e.g., novice users) of the management system.

In some implementations, an NL analysis system can be configured to evaluate a performance of an ML model from time to time, for example, on a predetermined schedule. The evaluation can be performed in any suitable manner. For example, an ML Model configured to perform inference of intent can be evaluated by comparing intent inferred by the model with an indication of true intent. A measure of similarity between the inferred intent and the true intent can be used as a metric of performance of the ML model. The similarity measures can be in the form of a fraction with highest similarity indicating a 1.

FIG. 15 shows a table listing the input in the form of natural language phrase or request, the predicted output based on inference of intent by an ML model and the true intent given by the correct output. The predicted output and the correct output can be viewed as text phrases or strings and can be compared for similarity in a one-to-one manner. The comparison between true intent and inferred intent can be broken down by breaking phrases into n-grams (bigrams, unigrams, etc.). The measure of similarity can include any suitable performance metric including metrics like precision (calculated by number of correct n-grams/total number of n-grams in the predicted output), recall also referred to as sensitivity (calculated by number of correct n-grams/total number of n-grams in the correct output).

In some implementations, evaluation of performance of one or more ML models can include calculating one or more integrity measures. Metrics representing integrity measures can include a parseability metric calculated by a fraction of percentage of responses returned upon intent inference based on natural language phrases (e.g., template queries or JSON blobs) that are parseable. Another integrity measure can be a measure of a fraction or percentage of the response returned (e.g., template queries or JSON blobs) that obey API JSON schema.

As described previously, sample natural language phrases can be provided as seed or reference NL phrases to an ML model to generate natural language phrases that are similar. In some instances, the seed or reference phrases can be from user approved finalized queries or NL requests. In some instances, the seed or reference phrases can be obtained from human users (experienced staff operators of the management system, mechanical Turkers, other suitable methods of crowdsourcing, etc.). The human users can be provided with a list of functions that are desired to be supported and the users can be requested to provide synonyms or context specific seed phrases for each function. The seed phrases can be configured to meet a specified template provided by the reference collection body (e.g., an operator attempting to generate augmented training data). FIG. 16 shows example forms that can be provided to human users to obtain such example seed or reference phrases.

In some implementations, the human users can be prompted to pick each seed phrase or reference phrases provided and use that seed phrase as a reference NL phrase to the ML model configured to generate natural language phrases similar to the reference NL phrase. For example, prompt the ML model to generate ten sentences or phrases similar to a seed phrase for example, by typing a reference phrase in a text space in an NL interface followed by a button press in the NL interface, or by providing a command (e.g., "Generate ten sentences similar to the following:". The human user can then curate the list generated by the ML model by marking the sentences that are semantically equivalent to the reference sentence (JSON pair). In some instances, the human user can be prompted to generate a few (e.g., two, five, ten, etc.) sentences or phrases that are semantically similar but syntactically different from the reference phrases or seed phrases. Theses syntactically different phrases can then be used to provide reference NL phrases to ML models to generate even more combinatorically expanded number of sample NL phrases.

While the embodiments described indicate a user entry of natural language phrases by typing into text spaces, in some embodiments, an NL interface can be configured to accept entry of natural language phrases in the form of voice data, for example as spoken phrases received via a microphone associated with the NL analysis device.

While the embodiments described use cybersecurity management systems as an example, the described methods, systems, and apparatus can be used to implement an NL interface to operate or manipulate any suitable management system or any suitable system that is governed or operated using a set of commands of functions that can be learned to be associated with natural language phrases. For example, systems can include any suitable analytical systems (e.g., systems configured to acquire and analyze data of any kind), data systems configured to manage data transfer and/or storage, systems configured to manage communications between devices or entities, systems configured to manage operations of equipment (e.g., heavy equipment or intricate equipment), systems configured to manage manipulation of complex instrumentation (e.g., medical, technical, and/or scientific instrumentation), systems configured to curate and manage information or object storage and/or retrieval (e.g., archival systems managing databases, repositories, libraries, and/or other organizational systems), and or the like.

While various embodiments have been described above, it should be understood that they have been presented by way of example only, and not limitation. Where methods and/or schematics described above indicate certain events and/or flow patterns occurring in certain order, the ordering of certain events and/or flow patterns can be modified. While the embodiments have been particularly shown and described, it will be understood that various changes in form and details can be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments, and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In some embodiments, a method comprises receiving, via an interface, a natural language request for performing an identified task in a management system. The management system is associated with a set of system commands. The set of system commands is configured to perform one or more computational tasks associated with the management system, the identified task being from the one or more computational tasks. The management system operates within an identified context. The method includes extracting a set of features from the natural language request based on the identified context. The method includes providing the set of features to a first machine learning (ML) model to infer a template command based on the natural language request, the template system command being associated with the set of system commands. The first ML model is trained using first training data that includes a set of natural language phrases associated with the context. The first ML model is trained to receive, as input, features based on the set of natural language phrases. The method further includes receiving, as output from the first ML model, the template command associated with the natural language request. The method further includes displaying the template command, via the interface, and in an editable form to be edited or approved by a user. The method further includes receiving a final command approved by the user via the interface. The final command is based on the template command. The method further includes providing the final command as a reference input to a second ML model. The second ML model is configured to generate a set of natural language phrases semantically related to the reference input. The method further includes receiving, from the second ML model, the set of natural language phrases semantically related to the reference input. The method further includes generating a second training data based on the set of natural language phrases semantically related to the reference input. The method further includes augmenting the first training data by adding the second training data to the first training data to generate third training data. The method further includes providing the final command to the management system to implement the identified task.

In some embodiments, the method can be such that the providing the set of features to the first ML model to infer the template command can include parsing the natural language request into a set of portions. The parsing can be configured to predict the template command based on the natural language request using the first ML model. The template command can include the set of portions such that each portion from the set of portions is associated with a parameter from a set of parameters.

In some embodiments, the method can be such that the displaying the template command includes displaying the set of portions of the template command via the interface. The interface can be configured to receive changes provided by the user to a portion from the set of portions of the template query. The changes can be used to form the final command.

In some embodiments, the receiving the natural language request can include receiving an incomplete portion of the natural language request. The method can include automatically inferring a set of potential options based on the incomplete portion of the natural language request, using a third ML model. Each option from the set of potential options can provide a remaining portion of the natural language request. The method can further include displaying the set of potential options to the user as a selectable list via the interface. The interface can be configured to allow the user to select at least one option from the set of potential options for providing a remaining portion of the natural language request. The method can further include receiving a selection of one option from the set of options to generate a complete natural language request to perform the identified task. The method can further include generating a fourth training data based on the incomplete portion of the natural language request, and the one option from the set of options. The method can further include augmenting the first training by adding the fourth training data to the first training data to generate fifth training data.

In some embodiments, the receiving the final command can include receiving changes to each portion from the set of portions of the template command to form the final command. The method can further include generating a fourth training data based on the changes to each portion from the set of portions of the template command. The fourth training data can be configured to improve performance of the first ML model at inferring the template command or the second ML model at generating a set of natural language phrases semantically related to the reference input.

In some embodiments, the first ML model used in the method can be configured to implement a rule-based procedure to parse the natural language request to predict a set of parameters. The template command can be based on the set of parameters.

In some embodiments, an apparatus comprises a memory including processor-executable instructions, and one or more hardware processors in communication with the memory. The one or more hardware processors can be configured to execute the processor-executable instructions. The one or more hardware processors can be configured to receive first training data based on an identified context associated with cybersecurity. The one or more hardware processors can train a machine learning (ML) model using the first training data. The machine learning (ML) model can be trained to receive a set of natural language phrases as input and infer a template system command based on each natural language phrase from the set of natural language phrases received. The template system command can be associated with a set of system commands configured to perform computational tasks associated with a cybersecurity management system operating within the identified context. The one or more hardware processors can be configured to receive a sample natural language phrase via an interface. The sample natural language phrase can be associated with a user request for performing an identified computational task associated with implementing measures for malware detection and mitigation. The one or more hardware processors can be configured to provide the sample natural language phrase as input to the ML model to infer a template command based on the sample natural language phrase. The one or more hardware processors can be configured to receive edits to the template command provided by a user, via the interface. The one or more hardware processors can generate second training data based on the sample natural language phrase and the edits to the template command provided by the user. The one or more hardware processors can be configured to augment the first training data by adding the second training data to the first training data to generate third training data. Based on the edits to the template command, the one or more hardware processors can generate a finalized command associated with the identified computational task. The one or more hardware processors can be configured to provide the finalized command to the management system such that the management system performs the identified computational task. The one or more hardware processors can be configured to modify a setting in the management system based on the performance of the identified computational task.

In some embodiments, the ML model is configured to generate the template command by parsing the sample natural language phrase into a set of portions. Each portion from the set of portions can be associated with a parameter from a set of parameters. The one or more hardware processors can cause the template command, including the set of parameters, to be displayed, via the interface such that the template command, including the set of parameters, is editable by the user.

In some embodiments, at least one of the set of portions or the set of parameters is determined based on a syntax associated with the natural language data.

In some embodiments, the one or more hardware processors are configured to cause the display of the set of parameters such that each portion of the template command is displayed as one option from multiple options. The multiple options can be associated with a parameter from the set of parameters. The one or more hardware processors can provide control tools, via the interface, to receive a selection of at least one option from the multiple options from a user. The selection can form the edits to the template command.

In some embodiments, the control tools can include an activatable dropdown menu listing the multiple options associated with each parameter from the set of parameters.

In some embodiments, the ML model is configured to receive a partially complete portion of the sample natural language phrase associated with a user request for performing the identified computational task. The ML model is configured to automatically infer, based on the partially complete portion, at least a part of a remaining portion of the sample natural language phrase.

In some embodiments, the ML model can be a first ML model and the processors can be further configured to provide the sample natural language phrase, the template command, the edits to the template commands, or the finalized command, to a second ML model as a reference input. The second ML model can be trained on natural language data associated with the identified context. The one or more hardware processors can be configured to invoke the second ML model to generate a set of natural language phrases semantically related to the reference input. The one or more hardware processors can generate a fourth training data based on the set of natural language phrases semantically related to the reference input. The one or more hardware processors can further augment the first training data or the third training data by adding the fourth training data to each.

In some embodiments, the identified computational task can include blocking a communication or a host, applying a patch to a set of hosts, rebooting a machine, or executing a rule at an identified endpoint.

In some embodiments, the first ML model is configured to generate the template command by parsing the sample natural language phrase associated with the user request into a set of portions. Each portion from the set of portions can be associated with a parameter from a set of parameters. The set of parameters can include, for example, an action parameter, an object parameter, or a descriptor parameter associated with the object parameter.

Embodiments disclosed include a non-transitory processor-readable medium storing code representing instructions to be executed by one or more processors. The instructions comprise code to cause the processors to receive a first portion of a natural language request via an interface. The first portion of the natural language request indicates an identified context associated with a task to be performed via a management system. The instructions include code to cause the one or more processors to provide the first portion of the natural language request to a first machine learning (ML) model. The first ML model can be configured to predict a set of options from the portion of the natural language request and the identified context. Each option from the set of options can indicate a second portion of the natural language request such that together the first portion and the second portion can generate a more complete natural language request. The first ML model can be trained using first training data associated with the identified context. The instructions include code to cause the one or more processors display, via the interface, the set of options as a list from which a user may select an option from the set of options. The instructions include code to cause the one or more processors to receive, via the interface, a selection of the option from the set of options to generate a complete natural language request to perform an identified task. The instructions can further include code to cause the one or more processors to generate second training data based on the first portion of the natural language request and the option from the set of options. The instructions can further include code to cause the one or more processors to provide the complete natural language request as an input to a second ML model. The second ML model can be used to generate a template command based on the complete natural language request. The instructions can further include code to cause the one or more processors to augment the first training by adding the second training data to the first training data to generate third training data. The third training data can be configured to improve performance of the first ML model at predicting the option from the set of options to generate the complete natural language request. The third training data can be configured to improve performance of the second ML model at generating the template command based on the complete natural language request. The instructions can further include code to cause the one or more processors to provide the template command to the management system to perform the task via the management system. The instructions can further include code to cause the one or more processors to receive an indication confirming a completion of the task via the management system.

In some embodiments, the second ML model can be the same as the first ML model. In some embodiments, the second ML model is different than the first ML model.

In some embodiments, the instructions can further include code to cause the one or more processors to receive the template command from the second ML model such that the template command includes a set of portions. Each portion from the set of portions can be associated with a parameter from a set of parameters. The second ML model can be configured to predict the set of parameters based on the identified context associated with the complete natural language request. The instructions can include code to cause the one or more processors to display the template query including the set of portions forming the template query and the set of parameters, via the interface.

In some embodiments, the first ML model and/or the second ML model can be a Generative Pre-trained Transformer 3 (GPT-3) model.

In some embodiments, the second ML model is trained to parse natural language data obtained from a plurality of language corpuses. The code to cause the one or more processors to generate the template query can include code to cause the one or more processors to train the second ML model to receive a natural language phrase associated with a task to implement the cybersecurity measures, using natural language data associated with potential cybersecurity measures. The complete natural language request can be based on the natural language phrase. The complete natural language request can be provided to the second ML model to generate the template command based on a set of parameters including an action parameter associated with the cybersecurity measures.

In some embodiments, the action parameter associated with the cybersecurity measures can include blocking a communication or a host, allowing a communication, filtering a set of data, sorting a set of data, displaying a set of data, applying a patch, rebooting an endpoint, or executing a rule.

Embodiments described include an apparatus comprising a memory and one or more hardware processors operatively coupled to the memory. The one or more hardware processors are configured to receive natural language data via an interface. The natural language data is associated with a user request for performing an identified computational task associated with a cybersecurity management system. The one or more hardware processors are configured to provide the natural language data as input to a machine learning (ML) model. The ML model is configured to automatically infer a template query based on the natural language data. The one or more hardware processors are configured to cause the template query to be displayed, via the interface, the template query being editable by a user. The one or more hardware processors are configured to receive user input via the interface. The user input indicates a finalized query associated with the identified computational task. The one or more hardware processors are configured to provide the finalized query as input to a system configured to perform the identified computational task. The one or more hardware processors are configured to modify a security setting in the cybersecurity management system based on the performance of the identified computational task.

In some embodiments, the template query is a first template query. The one or more hardware processors are further configured to receive edits made by a user to the first template query via the interface. The edits generate a second template query. The one or more hardware processors are further configured to provide the edits as training input to the ML model. The ML model can be trained using the training input to improve performance at inferring the second template query given the natural language data associated with the user request.

In some embodiments, the ML model is configured to generate the template query by parsing the natural language data associated with a user request into a set of portions. Each portion from the set of portions can be associated with a parameter from a set of parameters, and the processor can be configured to cause the display of the template query including the set of parameters via the interface.

In some embodiments, the set of portions or the set of parameters is determined based on a syntax associated with the natural language data.

In some embodiments, the one or more hardware processors are configured to cause the display of the set of parameters such that each portion from the set of portions is displayed as one option from multiple options that are associated with a parameter from the set of parameters. The one or more hardware processors can be further configured to provide control tools via the interface. The control tools can be configured to receive a selection of at least one option from the multiple options associated with each parameter from the set of parameters.

In some embodiments, the control tools can include an activatable dropdown menu listing the multiple options associated with each parameter from the set of parameters.

In some embodiments, the ML model is configured to receive a partially complete portion of the natural language data associated with the user request for performing the identified computational task and automatically infer, based on the partially complete portion, at least a part of a remaining portion of the natural language data associated with the user request.

In some embodiments, the ML model is trained across a plurality of language corpuses to receive natural language data associated with a user request and automatically infer a corresponding template query based on the natural language data.

In some embodiments, the management system is a cybersecurity management system, and the identified computational task is associated with implementing measures for malware detection and mitigation. The ML model can be trained to receive natural language data associated with a user request and automatically infer a corresponding template query based on training the ML model using natural language data related to cybersecurity.

In some embodiments, the identified computational task can include blocking a communication or a host, applying a patch to a set of hosts, rebooting a machine, or executing a rule at an identified endpoint.

In some embodiments, the ML model is configured to generate the template query by parsing the natural language data associated with a user request into a set of portions. Each portion from the set of portions can be associated with a parameter from a set of parameters. The set of parameters can include an action parameter, an object parameter, or a descriptor parameter associated with the object parameter.

Embodiments disclosed include a method that comprises receiving a natural language request for performing an identified task in a cybersecurity management system via an interface. The method includes parsing the natural language request into a set of portions to predict a template query based on the natural language request, using a machine learning (ML) model. The template query includes the set of portions, with each portion from the set of portions being associated with a parameter from a set of parameters. The method includes displaying the set of portions of the template query via the interface. The interface is configured to receive changes provided by a user to a portion from the set of portions of the template query to form a finalized query. The method further includes providing the finalized query to the cybersecurity management system to implement the identified task.

In some embodiments, the method further comprises receiving an incomplete portion of the natural language request, and automatically predicting a set of potential options, each of which provides a remaining portion of the natural language request. The method includes predicting the set of potential options using the ML model and based on the incomplete portion of the natural language request. The method further includes presenting the set of potential options to the user via the interface. The interface is configured to allow the user to select at least one option from the set of potential options for providing a remaining portion of the natural language request.

In some embodiments, the method further comprises providing the changes to each portion from the set of portions of the template query as training input to the ML model. The training input can be configured to improve performance of the ML model at inferring the finalized query based on the natural language request for performing the identified task.

In some embodiments, the ML model is configured to receive an incomplete portion of the natural language request, and based on the incomplete portion infer a context associated with the natural language request. The prediction of the template query using the ML model is based on the inferred context.

In some embodiments, the ML model is configured to implement a rule-based procedure to parse the natural language request to predict the set of parameters and the template query.

Embodiments disclosed include a non-transitory processor-readable medium storing code representing instructions to be executed by one or more processors. The instructions comprise code to cause the one or more processors to receive a first portion of a natural language request via an interface. The first portion of the natural language request indicates a context associated with a task to be performed via a management system. The instructions comprise code to cause the one or more processors to provide the first portion of the natural language request to a first machine learning (ML) model to predict from the portion of the natural language request and the context, a set of options. Each option from the set of options indicates a second portion of the natural language request to generate a complete natural language request. The instructions further comprise code to cause the one or more processors to invoke a display of the set of options as a selectable list via the interface. The instructions further comprise code to cause the one or more processors to receive a selection of an option from the set of options, via the interface, to generate a complete natural language request to perform an identified task. The instructions further comprise code to cause the one or more processors to provide the complete natural language request as an input to a second ML model to generate a template query based on the complete natural language request. The template query is configured to infer the task to be performed via the management system. The instructions further comprise code to cause the one or more processors to receive confirmation of the inferred task to be performed via the management system, and implement the task via the management system.

In some embodiments, the second ML model is the same as the first ML model. In some embodiments, the second ML model is different than the first ML model.

In some embodiments, the non-transitory processor-readable medium storing code representing instructions further comprises code to cause the one or more processors to receive the template query including a set of portions forming the template query, from the second ML model. Each portion from the set of portions is associated with a parameter from a set of parameters. The second ML model is configured to predict the set of parameters based on a context associated with the complete natural language request. The instructions further comprise code to cause the one or more processors to display, via the interface, the template query including the set of portions forming the template query and the set of parameters.

In some embodiments, the instructions further comprise code to cause the one or more processors to invoke a display of the set of portions and the set of parameters such that each portion from the set of portions is displayed as a first option from multiple options associated with a parameter from the set of parameters. The interface is configured to allow selection of a first option from the multiple options associated with each parameter from the set of parameters. The instructions further comprise code to cause the one or more processors to receive changes to the template query, the changes being input as a selection of a second option from the plurality of options. The second option can be different than the first option for at least one parameter from the set of parameters. The instructions further comprise code to cause the one or more processors to generate a modified query based on the changes to the template query, the inferred task to be performed via the management system being based on the modified query.

In some embodiments, the first ML model and/or the second ML model is a Generative Pre-trained Transformer 3 (GPT-3) model.

In some embodiments, the second ML model is trained on parsing natural language data obtained from a plurality of language corpuses. The code to cause the one or more processors to generate the template query further comprises code to cause the one or more processors to train the ML model, using natural language data associated with potential actions performed for implementing cybersecurity, to receive a natural language phrase associated with a task to implement cybersecurity measures. The instructions further comprise code to cause the one or more processors to provide the complete natural language request to the ML model to generate, based on the natural language phrase, the template query based on a set of parameters. The set of parameters includes an action parameter associated with the cybersecurity measures.

In some embodiments, the action parameter associated with the cybersecurity measures includes blocking a communication or a host, allowing a communication, filtering a set of data, sorting a set of data, displaying a set of data, applying a patch, rebooting an endpoint, or executing a rule.

What is claimed is:
1. An apparatus, comprising:
a memory; and
a processor operatively coupled to the memory, the processor configured to:
receive, via an interface, natural language data associated with a user request for performing an identified computational task associated with a cybersecurity management system;
provide the natural language data as input to a first machine learning (ML) model, the first ML model configured to automatically infer a template query based on the natural language data;
evaluate a performance of the first ML model;
generate a recommendation indicating a type of training data based on the performance;
train a second ML model to provide augmented training data, the augmented training data being the type of training data;
re-train the first ML model based on the augmented training data;
cause the template query to be displayed, via the interface, the template query being editable by a user;
receive, via the interface, user input indicating a finalized query associated with the identified computational task;
provide the finalized query as input to a system configured to perform the identified computational task; and
modify a security setting in the cybersecurity management system based on the performance of the identified computational task.

2. The apparatus of claim 1, wherein the template query is a first template query, the processor configured to:
receive, via the interface, one or more edits made, by a user, to the first template query to generate a second template query; and
provide, as training input, the one or more edits, to the first ML model, the first ML model being trained to improve performance at inferring the second template query given the natural language data associated with the user request.

3. The apparatus of claim 1, wherein the first ML model is configured to generate the template query by parsing the natural language data associated with a user request into a set of portions, each portion from the set of portions being associated with a parameter from a set of parameters, the processor configured to cause the display of the template query including the set of parameters via the interface.

4. The apparatus of claim 3, wherein the processor is configured to cause the display of the set of parameters such that each portion from the set of portions is displayed as one option from a plurality of options associated with a parameter from the set of parameters, the processor configured to:
provide control tools, via the interface, the control tools configured to receive, from the user, a selection of at least one option from the plurality of options associated with each parameter from the set of parameters.

5. The apparatus of claim 1, wherein the first ML model is configured to receive a partially complete portion of the natural language data associated with the user request for performing the identified computational task and automatically infer, based on the partially complete portion, at least a part of a remaining portion of the natural language data associated with the user request.

6. The apparatus of claim 1, wherein the identified computational task is associated with implementing measures for malware detection and mitigation, the first ML model being trained to receive natural language data associated with a user request and automatically infer a corresponding template query based on training the first ML model using natural language data related to cybersecurity.

7. The apparatus of claim 6, wherein the identified computational task includes at least one of blocking a communication or a host, applying a patch to a set of hosts, rebooting a machine, or executing a rule at an identified endpoint.

8. The apparatus of claim 6, wherein the first ML model is configured to generate the template query by parsing the natural language data associated with the user request into a set of portions, each portion from the set of portions being associated with a parameter from a set of parameters, the set of parameters including at least one of an action parameter, an object parameter, or a descriptor parameter associated with the object parameter.

9. A method, comprising:
receiving, via an interface, a natural language request for performing an identified task in a cybersecurity management system;
parsing the natural language request into a set of portions to predict, using a first machine learning (ML) model, a template query based on the natural language request, the template query including the set of portions, each portion from the set of portions being associated with a parameter from a set of parameters;
evaluating a performance of the first ML model;
generating a recommendation indicating a type of training data based on the performance;
training a second ML model to provide augmented training data, the augmented training data being the type of training data;
re-training the first ML model based on the augmented training data;
displaying, via the interface, the set of portions of the template query, the interface configured to receive changes, provided by a user, to a portion from the set of portions of the template query to form a finalized query; and
providing the finalized query to the cybersecurity management system to implement the identified task.

10. The method of claim 9, further comprising:
receiving an incomplete portion of the natural language request;
automatically predicting using the first ML model, based on the incomplete portion of the natural language request, a set of potential options, each option from the set of potential options providing a remaining portion of the natural language request; and
presenting, via the interface, the set of potential options to the user, the interface configured to allow the user to select at least one option from the set of potential options for providing a remaining portion of the natural language request.

11. The method of claim 9, further comprising:
providing the changes to each portion from the set of portions of the template query to form a finalized query as training input to the first ML model, the training input configured to improve performance of the first ML model at inferring the finalized query based on the natural language request for performing the identified task.

12. The method of claim 9, wherein the first ML model is configured to receive an incomplete portion of the natural language request, and based on the incomplete portion infer a context associated with the natural language request, the prediction of the template query being based on the inferred context.

13. A non-transitory processor-readable medium storing code representing instructions to be executed by a processor, the instructions comprising code to cause the processor to:
receive, via an interface, a first portion of a natural language request, the first portion of the natural language request indicating a context associated with a task to be performed via a management system;
provide, the first portion of the natural language request to a first machine learning (ML) model, the first ML model configured to predict from the first portion of the natural language request and the context, a set of options, each option from the set of options indicating a second portion of the natural language request to generate a complete natural language request;
invoke a display, via the interface, of the set of options as a selectable list;
receive, via the interface, a selection of an option from the set of options to generate a complete natural language request to perform an identified task;
provide the complete natural language request as an input to a second ML model;
generate, using the second ML model, a template query based on the complete natural language request, the template query configured to infer the task to be performed via the management system;
evaluate a performance of the second ML model;
generate a recommendation indicating a type of training data based on the performance;
train a third ML model to provide augmented training data, the augmented training data being the type of training data;
re-train the second ML model based on the augmented training data;
receive confirmation of the inferred task to be performed via the management system; and
implement the task via the management system.

14. The non-transitory processor-readable medium of claim 13, wherein the second ML model is the same as the first ML model.

15. The non-transitory processor-readable medium of claim 13, wherein the second ML model is different than the first ML model.

16. The non-transitory processor-readable medium of claim 13, further comprising code to cause the processor to:
receive, from the second ML model, the template query including a set of portions forming the template query, each portion from the set of portions being associated with a parameter from a set of parameters, the second ML model configured to predict the set of parameters based on a context associated with the complete natural language request; and
display, via the interface, the template query including the set of portions forming the template query and the set of parameters.

17. The non-transitory processor-readable medium of claim 16, further comprising code to cause the processor to:
invoke a display of the set of portions and the set of parameters such that each portion from the set of portions is displayed as a first option from a plurality of options associated with a parameter from the set of parameters, the interface configured to allow selection of a first option from the plurality of options associated with each parameter from the set of parameters;

receive changes to the template query, the changes being input as a selection of a second option from the plurality of options, the second option being different than the first option for at least one parameter from the set of parameters; and generate a modified query based on the changes to the template query, the inferred task to be performed via the management system being based on the modified query.

18. The non-transitory processor-readable medium of claim 13, wherein the first ML model or the second ML model is a transformer.

19. The non-transitory processor-readable medium of claim 13, wherein the second ML model is trained on parsing natural language data obtained from a plurality of language corpuses, the code to cause the processor to generate the template query further comprising code to cause the processor to:

train the second ML model, using natural language data associated with potential actions performed for implementing cybersecurity, to receive a natural language phrase associated with a task to implement cybersecurity measures, the code to cause the processor to provide the complete natural language request to the second ML model to generate a template query includes code to cause the processor to provide the complete natural language request to the second ML model to generate, based on the natural language phrase, the template query based on a set of parameters, the set of parameters including an action parameter associated with the cybersecurity measures.

20. The non-transitory processor-readable medium of claim 19, wherein the action parameter associated with the cybersecurity measures includes at least one of blocking a communication or a host, allowing a communication, filtering a set of data, sorting a set of data, displaying a set of data, applying a patch, rebooting an endpoint, or executing a rule.

* * * * *